US012633999B2

(12) United States Patent
Takizawa

(10) Patent No.: US 12,633,999 B2
(45) Date of Patent: May 19, 2026

(54) RELAY STATION, INFORMATION PROCESSING APPARATUS, AND METHOD

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 18/474,858

(22) Filed: Sep. 26, 2023

(65) Prior Publication Data

US 2024/0113770 A1 Apr. 4, 2024

(30) Foreign Application Priority Data

Sep. 28, 2022 (JP) ................................. 2022-155389

(51) Int. Cl.
| | |
|---|---|
| *H04B 7/155* | (2006.01) |
| *H04B 17/336* | (2015.01) |
| *H04B 17/40* | (2015.01) |
| *H04W 52/24* | (2009.01) |
| *H04W 52/42* | (2009.01) |
| *H04W 52/52* | (2009.01) |

(52) U.S. Cl.
CPC ....... *H04B 7/15507* (2013.01); *H04B 17/336* (2015.01); *H04B 17/40* (2015.01); *H04W 52/243* (2013.01); *H04W 52/42* (2013.01); *H04W 52/52* (2013.01)

(58) Field of Classification Search
CPC ........... H04B 7/14; H04B 7/145; H04B 17/40
See application file for complete search history.

(56) References Cited

U.S. PATENT DOCUMENTS

| | | |
|---|---|---|
| 2007/0066337 A1 | 3/2007 | Hart |
| 2007/0129008 A1* | 6/2007 | Shi ..................... H04B 7/15585 |
| | | 455/11.1 |
| 2009/0227202 A1 | 9/2009 | Doppler et al. |

(Continued)

OTHER PUBLICATIONS

"3GPP TS 38.174 V17.0.0", 3rd Generation Partnership Project, dated Mar. 2022, pp. 1-317.

(Continued)

*Primary Examiner* — Wen W Huang
(74) *Attorney, Agent, or Firm* — Finnegan, Henderson, Farabow, Garrett and Dunner, LLP

(57) ABSTRACT

A relay station includes a plurality of antennas and a controller. In non-regenerative relay of a first signal, the controller estimates an SINR of the first signal at a reception station after the relay on the basis of a transmit power of the first signal at a transmission station, first propagation characteristics between one or more first antennas set as reception antennas for the first signal and the transmission station, second propagation characteristics between one or more second antennas set as transmission antennas for the first signal after the relay and the reception station, a noise power and an interference power at the relay station, and a noise power at the reception station, and determines the first antennas and the second antennas in a combination that makes the SINR of the first signal at the reception station maximum respectively as the reception antennas and the transmission antennas.

18 Claims, 12 Drawing Sheets

(56)  References Cited

U.S. PATENT DOCUMENTS

| | | | |
|---|---|---|---|
| 2010/0272005 A1* | 10/2010 | Larsson | H04B 7/15564 455/24 |
| 2012/0015603 A1* | 1/2012 | Proctor, Jr. | H01Q 21/28 455/11.1 |
| 2012/0155372 A1* | 6/2012 | Lee | H04W 52/42 370/315 |
| 2012/0236955 A1 | 9/2012 | Zhou | |
| 2023/0327746 A1* | 10/2023 | Wai | H04B 7/08 |
| 2023/0412236 A1* | 12/2023 | Kalantari | H04B 7/0695 |
| 2025/0133416 A1* | 4/2025 | Kumagai | H04W 24/10 |

OTHER PUBLICATIONS

"3GPP TS 38.106 V1.0.0", 3rd Generation Partnership Project, dated Mar. 2022, pp. 1-75.

* cited by examiner

IN A CASE WHERE THERE ARE SIX ANTENNAS $$K = ceil(\log_2 6) = 3$$

IN A CASE WHERE THERE ARE EIGHT ANTENNAS $$K = ceil(\log_2 8) = 3$$

*FIG. 8*

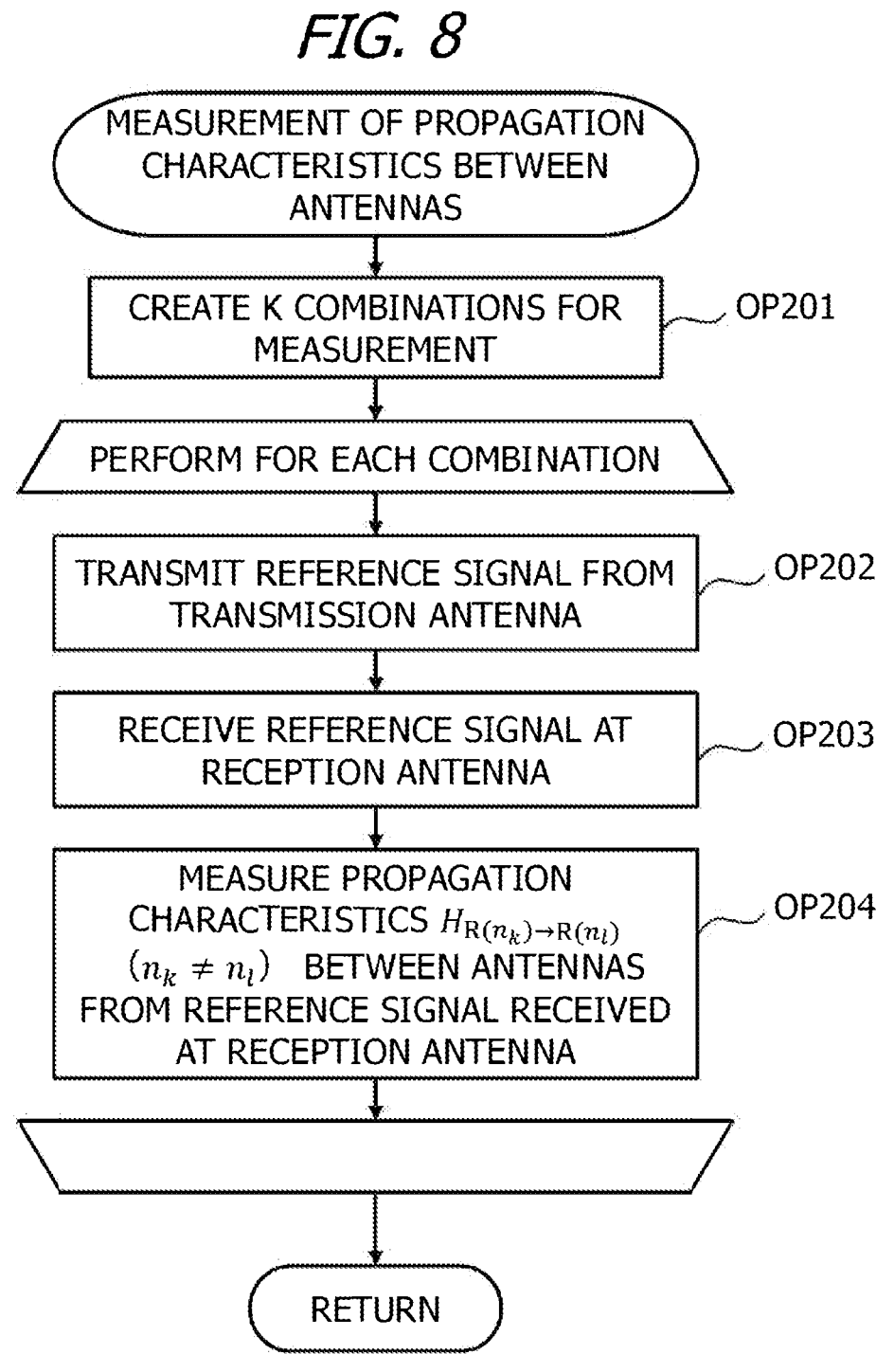

MEASUREMENT OF PROPAGATION CHARACTERISTICS BETWEEN ANTENNAS

CREATE K COMBINATIONS FOR MEASUREMENT — OP201

PERFORM FOR EACH COMBINATION

TRANSMIT REFERENCE SIGNAL FROM TRANSMISSION ANTENNA — OP202

RECEIVE REFERENCE SIGNAL AT RECEPTION ANTENNA — OP203

MEASURE PROPAGATION CHARACTERISTICS $H_{R(n_k) \to R(n_l)}$ $(n_k \neq n_l)$ BETWEEN ANTENNAS FROM REFERENCE SIGNAL RECEIVED AT RECEPTION ANTENNA — OP204

RETURN

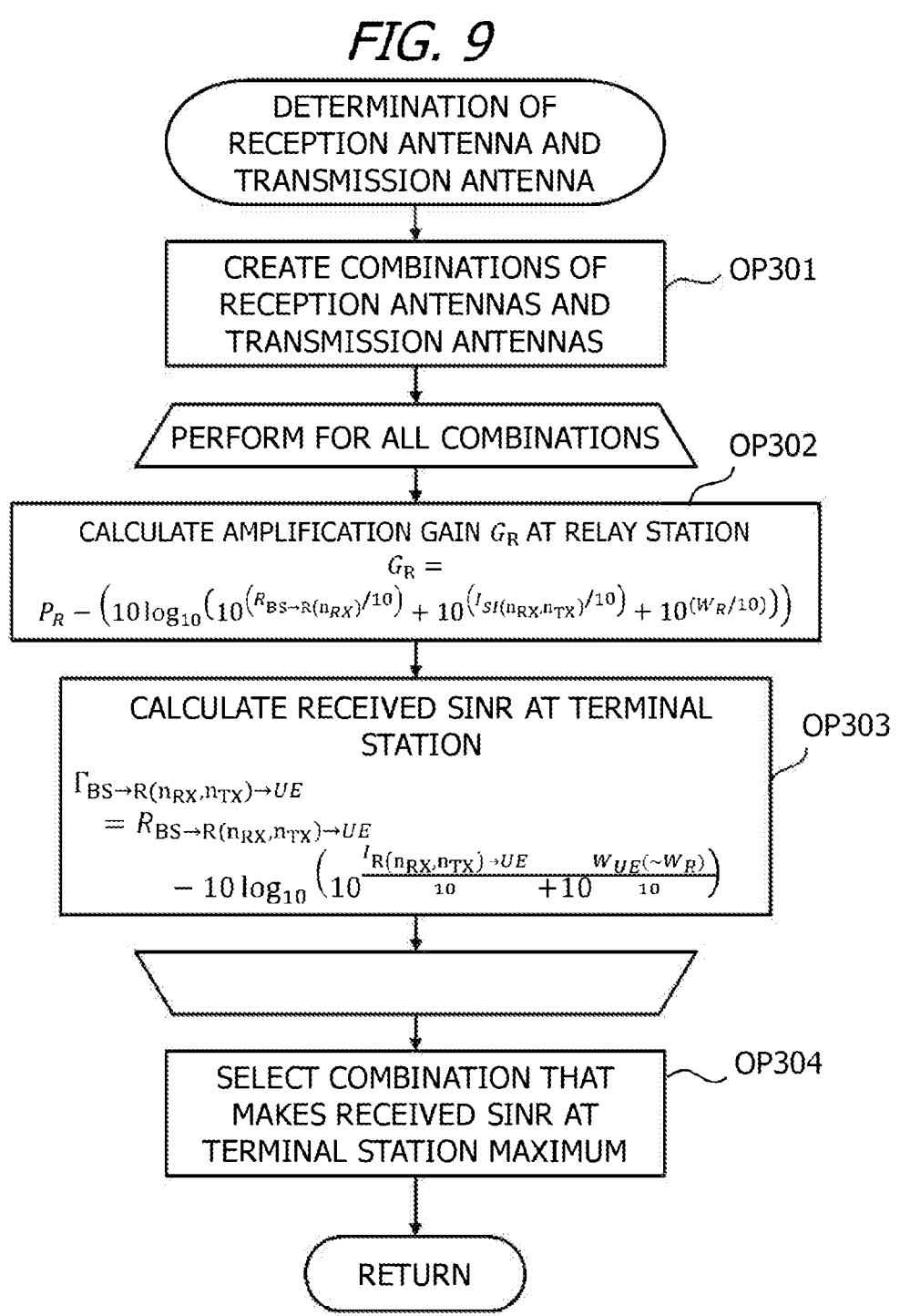

*FIG. 9*

DETERMINATION OF RECEPTION ANTENNA AND TRANSMISSION ANTENNA

CREATE COMBINATIONS OF RECEPTION ANTENNAS AND TRANSMISSION ANTENNAS — OP301

PERFORM FOR ALL COMBINATIONS  OP302

CALCULATE AMPLIFICATION GAIN $G_R$ AT RELAY STATION $$G_R = P_R - \left(10\log_{10}\left(10^{\left(R_{BS\rightarrow R(n_{RX})}/10\right)} + 10^{\left(I_{SI(n_{RX},n_{TX})}/10\right)} + 10^{(W_R/10)}\right)\right)$$

OP302

CALCULATE RECEIVED SINR AT TERMINAL STATION $$\Gamma_{BS\rightarrow R(n_{RX},n_{TX})\rightarrow UE}$$
$$= R_{BS\rightarrow R(n_{RX},n_{TX})\rightarrow UE}$$
$$- 10\log_{10}\left(10^{\frac{I_{R(n_{RX},n_{TX})\rightarrow UE}}{10}} + 10^{\frac{W_{UE(\sim W_R)}}{10}}\right)$$

OP303

SELECT COMBINATION THAT MAKES RECEIVED SINR AT TERMINAL STATION MAXIMUM — OP304

RETURN

FIG. 11

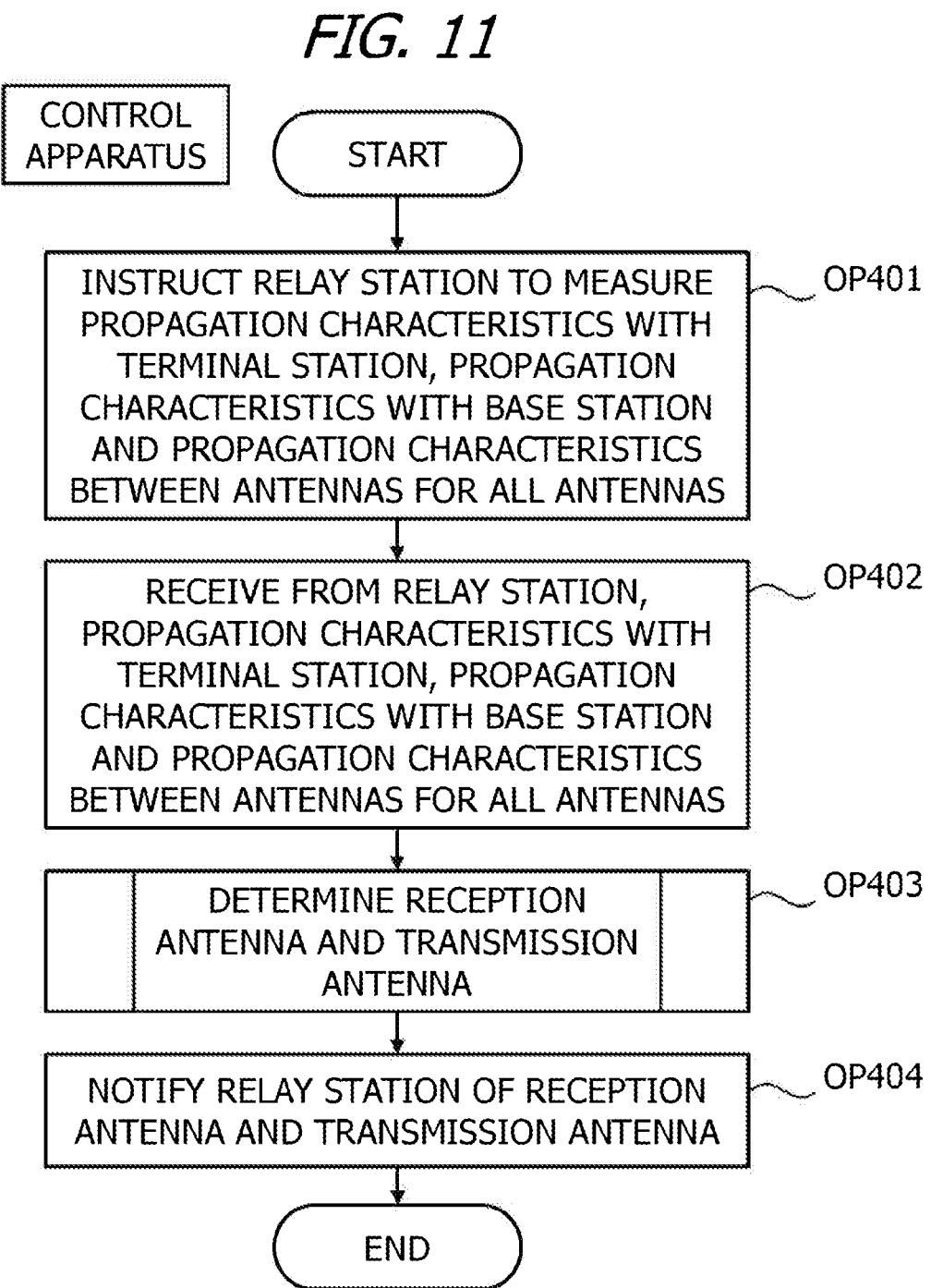

CONTROL APPARATUS

START

INSTRUCT RELAY STATION TO MEASURE PROPAGATION CHARACTERISTICS WITH TERMINAL STATION, PROPAGATION CHARACTERISTICS WITH BASE STATION AND PROPAGATION CHARACTERISTICS BETWEEN ANTENNAS FOR ALL ANTENNAS ⎯ OP401

RECEIVE FROM RELAY STATION, PROPAGATION CHARACTERISTICS WITH TERMINAL STATION, PROPAGATION CHARACTERISTICS WITH BASE STATION AND PROPAGATION CHARACTERISTICS BETWEEN ANTENNAS FOR ALL ANTENNAS ⎯ OP402

DETERMINE RECEPTION ANTENNA AND TRANSMISSION ANTENNA ⎯ OP403

NOTIFY RELAY STATION OF RECEPTION ANTENNA AND TRANSMISSION ANTENNA ⎯ OP404

END

RELAY STATION, INFORMATION PROCESSING APPARATUS, AND METHOD

CROSS REFERENCE TO RELATED APPLICATION

This application claims the benefit of Japanese Patent Application No. 2022-155389, filed on Sep. 28, 2022, which is hereby incorporated by reference herein in its entirety.

BACKGROUND

Technical Field

The present disclosure relates to a relay station, an information processing apparatus, and a method.

Description of the Related Art

In radio communication such as 5th generation mobile communication system (5G), ultra low-latency communication of submillisecond or less is expected. Meanwhile, in terms of improvement in communication services, it is desired to expand a coverage area of a cell, and relay communication by way of a relay station is effective to achieve this. Thus, a radio communication method in which a terminal station that performs radio communication is set as a relay station has been proposed. Further, as a low-latency relay technique, non-regenerative relay in which neither demodulation nor decoding is performed at the relay station is desired.

CITATION LIST

Non Patent Document

[Non Patent document 1] 3GPP TS 38.174 V17.0.0 (2022-03)

[Non Patent document 2] 3GPP TS 38.106 V1.0.0 (2022-03)

One aspect of the present disclosure is to provide a relay station, an information processing apparatus, and a method capable of selecting an antenna to be used for transmission and an antenna to be used for reception among a plurality of antennas provided at the relay station that performs non-regenerative relay so as to be able to provide stable communication.

SUMMARY

An aspect of the present disclosure is a relay station including:

a plurality of antennas; and
a controller configured to,
when a first signal transmitted from a transmission station to a reception station is relayed without being demodulated or decoded, and in a case where one or more first antennas among the plurality of antennas are set as reception antennas for the first signal, and one or more second antennas among the plurality of antennas are set as transmission antennas for the first signal after the relay, estimate a signal to interference and noise power ratio (SINR) of the first signal at the reception station after the relay on a basis of a transmit power of the first signal at the transmission station, first propagation characteristics between the one or more first antennas and the transmission station, second propagation characteristics between the one or more second antennas and the reception station, a noise power and an interference power at the relay station, and a noise power at the reception station, and determine the one or more first antennas and the one or more second antennas in a combination that makes the SINR maximum respectively as the reception antennas and the transmission antennas.

Another aspect of the present disclosure is an information processing apparatus comprising a controller configured to, when a relay station including a plurality of antennas relays a first signal transmitted from a transmission station to a reception station without demodulating or decoding the first signal, and in a case where one or more first antennas among the plurality of antennas are set as reception antennas for the first signal, and one or more second antennas among the plurality of antennas are set as transmission antennas for the first signal after the relay, estimate a signal to interference and noise power ratio (SINR) of the first signal at the reception station after the relay on a basis of a transmit power of the first signal at the transmission station, first propagation characteristics between the one or more first antennas and the transmission station, second propagation characteristics between the one or more second antennas and the reception station, a noise power and an interference power at the relay station, and a noise power at the reception station, and determine the one or more first antennas and the one or more second antennas in a combination that makes the SINR maximum respectively as the reception antennas and the transmission antennas.

Another aspect of the present disclosure is a method, comprising:

by a computer,
when a relay station including a plurality of antennas relays a first signal transmitted from a transmission station to a reception station without demodulating or decoding the first signal, and in a case where one or more first antennas among the plurality of antennas are set as reception antennas for the first signal, and one or more second antennas among the plurality of antennas are set as transmission antennas for the first signal after the relay, estimating a signal to interference and noise power ratio (SINR) of the first signal at the reception station after the relay on a basis of a transmit power of the first signal at the transmission station, first propagation characteristics between the one or more first antennas and the transmission station, second propagation characteristics between the one or more second antennas and the reception station, a noise power and an interference power at the relay station and a noise power at the reception station; and determining the one or more first antennas and the one or more second antennas in a combination that makes the SINR maximum respectively as the reception antennas and the transmission antennas.

According to one aspect of the present disclosure, it is possible to select an antenna to be used for transmission and an antenna to be used for reception among a plurality of antennas provided at a relay station that performs non-regenerative relay so as to be able to provide stable communication.

BRIEF DESCRIPTION OF THE DRAWINGS

FIG. 1 is a diagram illustrating an example of a system configuration of a communication system according to a first embodiment;

FIG. 3 is a diagram illustrating an example of a hardware configuration of the relay station;

FIG. 8 is an example of a flowchart of processing of measuring propagation characteristics between antennas of the relay station;

FIG. 9 is an example of a flowchart of processing of determining the transmission antenna and the reception antenna to be used for non-regenerative relay at the relay station;

FIG. 11 is an example of a flowchart of processing of determining the reception antenna and the transmission antenna to be used for non-regenerative relay at the relay station, to be performed by the control apparatus according to the second embodiment.

DESCRIPTION OF THE EMBODIMENTS

Figure 2:
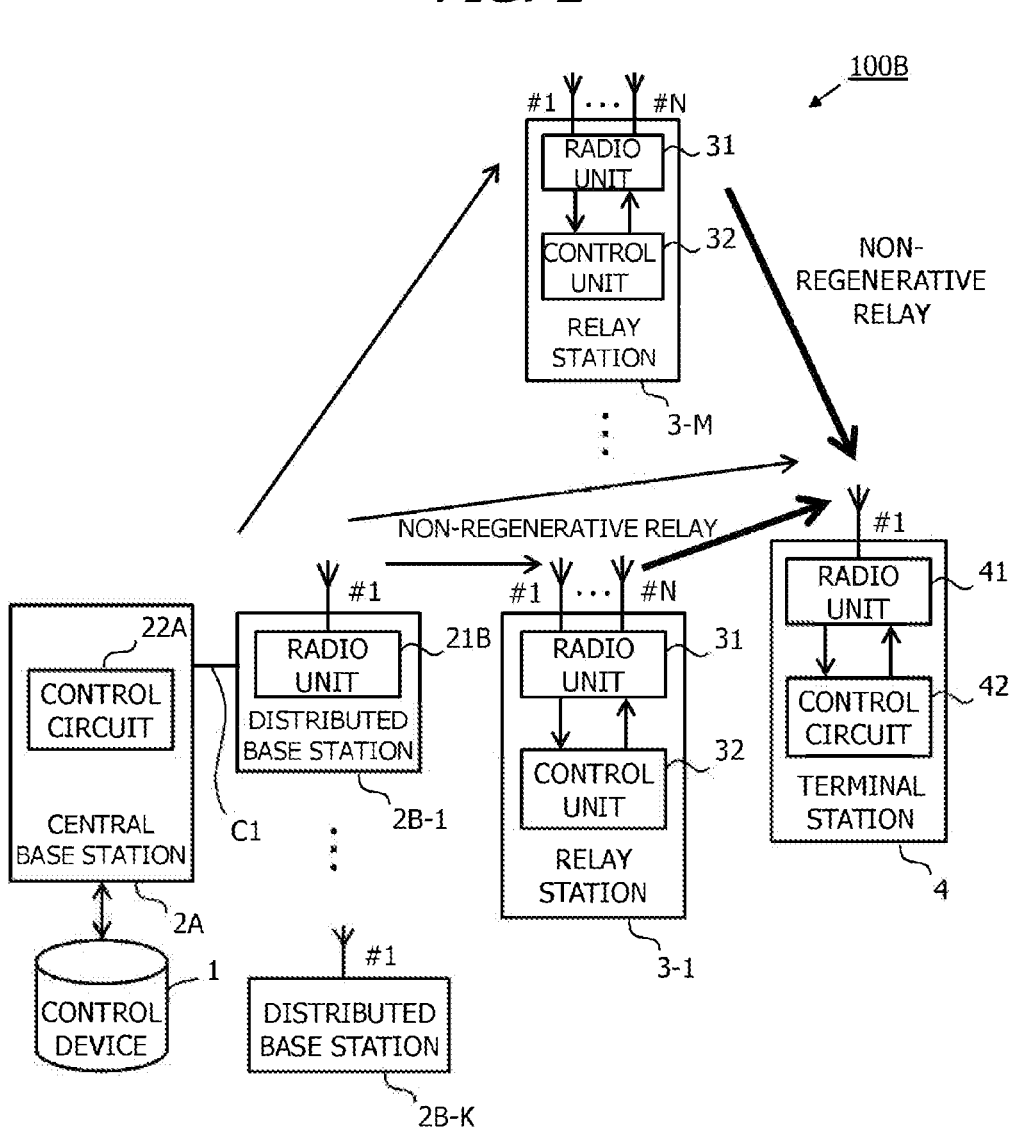
FIG. 2 is a diagram illustrating an example of a system configuration of a communication system.

In a case where a relay station includes a plurality of antennas, propagation characteristics between a transmission station and a reception station differ for each antenna. Thus, when the relay station performs non-regenerative relay, which antennas are used as a transmission antenna and a reception antenna affects communication quality. In view of this, in one aspect of the present disclosure, a relay station that performs non-regenerative relay selects a transmission antenna and a reception antenna among a plurality of antennas so as to be able to provide stable communication quality.

One aspect of the present disclosure may be a relay station including a plurality of antennas and a controller. Upon non-regenerative relay in which a first signal transmitted from a transmission station to a reception station is relayed without being demodulated or decoded, and in a case where one or more first antennas among the plurality of antennas are set as reception antennas for the first signal, and one or more second antennas among the plurality of antennas are set as transmission antennas for the first signal after the relay, the controller of the relay station may estimate an SINR of the first signal at the reception station after the relay. The SINR may be estimated on the basis of a transmit power of the first signal at the transmission station, first propagation characteristics between the one or more first antennas and the transmission station, second propagation characteristics between the one or more second antennas and the reception station, a noise power and an interference power at the relay station, and a noise power at the reception station. The controller determines the one or more first antennas and the one or more second antennas in a combination that makes the SINR of the first signal at the reception station after the relay maximum, respectively as reception antennas that receive the first signal and transmission antennas that transmit the first signal.

The relay station may be, for example, a base station, a small base station, a mobile base station, a smartphone, in-vehicle equipment, or the like. The relay station may perform non-regenerative relay in which a signal is relayed without being demodulated or decoded. The controller is, for example, a computer, a processor such as a central processing unit (CPU), an arithmetic circuit such as a field programmable gate array (FPGA). For example, the transmission station may be a base station, and the reception station may be a terminal station. However, the transmission station and the reception station may not be limited to these, and the transmission station may be a terminal station, and the reception station may be a base station.

The SINR of the first signal at the reception station after the relay may be acquired on the basis of the received power of the first signal after the relay, an interference power of an interference signal from the relay station and a noise power, at the reception station. The received power of the first signal after the relay by the relay station at the reception station may be acquired on the basis of the transmit power of the first signal from the transmission antenna of the relay station and the second propagation characteristics between the transmission antenna of the relay station and the reception station. The transmit power of the first signal from the transmission antenna of the relay station may be acquired at least on the basis of the transmit power of the first signal at the transmission station and the first propagation characteristics between the transmission station and the reception antenna of the relay station. Thus, the received power of the first signal after the relay by the relay station at the reception station may be acquired on the basis of the transmit power of the first signal at the transmission station, the first propagation characteristics between the transmission station and the reception antenna of the relay station, and the second propagation characteristics between the transmission antenna of the relay station and the reception station. The received power of the interference signal from the relay station at the reception station may be acquired on the basis of the noise power and the interference power at the relay station, and the second propagation characteristics between the transmission antenna of the relay station and the reception station. The noise power at the reception station may be acquired by, for example, notification through a control channel from the reception station prior to transmission of the first signal, or the noise power at the relay station may be used as an approximate value.

A notification of the transmit power of the first signal at the transmission station may be made, for example, from the transmission station through the control channel prior to transmission of the first signal. The first propagation characteristics between each antenna of the relay station and the transmission station may be, for example, measured by the relay station on the basis of a reference signal from the transmission station or may be measured by the transmission station and obtained by the relay station through notification. The second propagation characteristics between each antenna of the relay station and the reception station may be, for example, measured by the relay station on the basis of a reference signal from the reception station or may be measured by the reception station and obtained by the relay station through notification. The noise power at the relay station is a specified value. The interference power at the relay station may be, for example, measured by the relay station or may be determined as a specified value. Note that in one aspect of the present disclosure, the propagation characteristics may include a channel matrix, a channel coefficient or a coefficient indicating attenuation of power of a signal by propagation, which is called a propagation loss coefficient.

In one aspect of the present disclosure, even in a case where there is no feedback of an SINR of the first signal after the relay from the reception station, the relay station may, for example, determine a reception antenna and a transmission antenna that make the SINR maximum by estimating the SINR. By this means, in a case where the relay station performs non-regenerative relay, stable radio communication between the transmission station and the reception station may be provided. Note that the number of the reception antenna and the number of the transmission antenna selected from the plurality of antennas of the relay station are respectively not limited to one, and a plurality of antennas may be selected.

In one aspect of the present disclosure, the relay station may acquire the interference power at the relay station by the relay station itself measuring the interference power. In a case where the relay station performs non-regenerative relay, self interference occurs between the transmission antenna and the reception antenna. To reduce the self interference, the relay station may further include a first filter. In this case, the controller may create a plurality of combinations of one or more first antennas as the reception antennas and one or more second antennas as the transmission antennas among the plurality of antennas. The controller may calculate the SINR of the first signal at the reception station after the relay for each of the plurality of combinations on the basis of the transmit power of the first signal at the transmission station, the first propagation characteristics between the transmission station and the one or more first antennas, the second propagation characteristics between the one or more second antennas and the reception station, a transmit power allowable value of the first signal at the relay station, a reduced amount of the interference power by the first filter, third propagation characteristics between the one or more first antennas and one or more second antennas, the noise power at the relay station, and the noise power at the reception station. The controller may determine the one or more first antennas and the one or more second antennas in a combination that makes the SINR at the reception station maximum respectively as the reception antennas that receive the first signal and the transmission antennas that transmit the first signal.

The interference power at the relay station may be acquired on the basis of the transmit power allowable value at the relay station, the third propagation characteristics between the reception antenna (first antenna) and the transmission antenna (second antenna) and the reduced amount of the interference power by the first filter. The third propagation characteristics between the reception antenna (first antenna) and the transmission antenna (second antenna) may be, for example, measured by the relay station transmitting a reference signal from the transmission antenna (second antenna) and receiving the reference signal at the reception antenna (first antenna). As a result of the relay station itself measuring and acquiring the interference power at the relay station, a value more fitted to a propagation environment can be acquired, so that the SINR at the reception station can be estimated with higher accuracy.

In one aspect of the present disclosure, the relay station may amplify the first signal in non-regenerative relay. In this case, the transmit power of the first signal to be transmitted from the transmission antenna of the relay station may be represented using the received power of the first signal at the reception antenna of the relay station and an amplification gain at the relay station. Further, in conjunction with amplification of the first signal, the interference power and the noise power at the relay station may be also amplified. Thus, the received power of the interference signal from the relay station at the reception station may be represented using the noise power and the interference power at the relay station, the second propagation characteristics between the transmission antenna of the relay station and the reception station, and the amplification gain at the relay station.

Thus, in one aspect of the present disclosure, the controller may calculate the amplification gain at the relay station and calculate the SINR of the first signal at the reception station after the relay using the amplification gain. The amplification gain at the relay station may be acquired on the basis of the transmit power and the received power of the first signal at the relay station. The transmit power of the first signal at the relay station may be acquired on the basis of the transmit power allowable value of the first signal at the relay station, and the interference power and the noise power at the relay station. The allowable value of the transmit power of the first signal at the relay station may be, for example, set in advance or the transmission station may make a notification of the allowable value through the control channel prior to transmission of the first signal. The received power of the first signal at the relay station may be acquired on the basis of the transmit power of the first signal at the transmission station and the first propagation characteristics between the reception antenna of the relay station and the transmission station.

In other words, the amplification gain at the relay station may be calculated on the basis of the transmit power of the first signal at the transmission station, the transmit power allowable value of the first signal at the relay station, the reduced amount of the interference power by the first filter, the noise power to be applied at the relay station, the first propagation characteristics between the one or more first antennas (reception antennas) and the transmission station, and the third propagation characteristics between the one or more first antennas (reception antennas) and the one or more second antennas (transmission antennas).

In a case where the amplification gain at the relay station is used, the received signal power of the first signal at the reception station after the relay may be obtained using the transmit power of the first signal at the transmission station, the first propagation characteristics between the one or more first antennas (reception antennas) and the transmission station, the amplification gain, and the second propagation characteristics between the one or more second antennas (transmission antennas) and the reception station. The received signal power of the interference signal transmitted from the relay station at the reception station may be obtained on the basis of the transmit power allowable value of the first signal at the relay station, the third propagation characteristics between the one or more first antennas (reception antennas) and the one or more second antennas (transmission antennas), the reduced amount of the interference power by the first filter, the noise power to be applied at the relay station, the amplification gain and the second propagation characteristics between the one or more second antennas (transmission antennas) and the reception station.

According to one aspect of the present disclosure, even in a case where the first signal is amplified at the relay station, the SINR of the first signal at the reception station after the relay may be acquired with higher accuracy.

In one aspect of the present disclosure, in a case where the transmission station is a base station, and the reception station is a terminal station, the controller may use a value of the noise power at the relay station as an approximate value of the noise power at the reception station. For example, it is specified in the 5G standards that the relay station and the terminal station have equivalent reception performance, and thus, the value of the noise power at the relay station can be used as the approximate value of the noise power at the terminal station. This may omit communication for making an inquiry to the terminal station about the noise power at the terminal station as the reception station, so that it may be possible to efficiently determine the reception antenna and the transmission antenna to be used for non-regenerative relay.

In one aspect of the present disclosure, the controller may measure the first propagation characteristics between each of the plurality of antennas and the transmission station on the basis of the reference signal from the transmission station. Further, the controller may measure the second propagation characteristics between each of the plurality of antennas and the reception station on the basis of the reference signal from the reception station. Further, the controller may transmit a reference signal from at least part of the plurality of antennas and measure the third propagation characteristics between each of the plurality of antennas. As a result of the relay station measuring and acquiring these values, communication for making an inquiry to the reception station and the transmission station about these values may be omitted, so that it may be possible to efficiently determine the reception antenna and the transmission antenna to be used for non-regenerative relay.

In one aspect of the present disclosure, the controller may create K first combinations including one or more transmission antennas that transmit reference signals at the same time and one or more reception antennas that receive the reference signals transmitted from the one or more transmission antennas at the same time for a plurality of antennas. The controller may measure the third propagation characteristics for each of the K first combinations between each of the plurality of antennas through transmission and reception of the reference signals. The number K may be an integer obtained by rounding out, to a decimal point, a logarithm to base 2 of a number of the plurality of antennas N as a variable. The K first combinations may be created so that a second combination obtained by selecting two antennas of a third antenna and a fourth antenna among the plurality of antennas does not overlap with any of a combination of the third antenna as the transmission antenna for the reference signal and the fourth antenna as the reception antenna for the reference signal, and a combination of the fourth antenna as the transmission antenna for the reference signal and the third antenna as the reception antenna for the reference signal among the K first combinations.

This may make the number of times that the reference signal is transmitted from the transmission antenna and the reference signal is received at the reception antenna, minimum. This may shorten a period needed for measuring the third propagation characteristics between each of the plurality of antennas, so that it is possible to efficiently determine the reception antenna and the transmission antenna to be used for non-regenerative relay.

Another aspect of the present disclosure may be an information processing apparatus different from a relay station, which determines a reception antenna and a transmission antenna to be used for non-regenerative relay at the relay station. The information processing apparatus may be, for example, a base station, a control apparatus connected to the base station or a terminal station. The information processing apparatus may include a controller configured to, when the relay station including a plurality of antennas relays a first signal transmitted from a transmission station to a reception station without demodulating or decoding the first signal, and in a case where one or more first antennas among the plurality of antennas are set as reception antennas for the first signal, and one or more second antennas among the plurality of antennas are set as transmission antennas for the first signal after the relay, estimate an SINR of the first signal at the reception station after the relay on the basis of a transmit power of the first signal at the transmission station, first propagation characteristics between the one or more first antennas and the transmission station, second propagation characteristics between the one or more second antennas and the reception station, a noise power and an interference power at the relay station, and a noise power at the reception station, and determine the one or more first antennas and the one or more second antennas in a combination that makes the SINR maximum respectively as reception antennas that receive the first signal and transmission antennas that transmit the first signal after the relay.

The information processing apparatus may acquire the first propagation characteristics between each of the plurality of antennas and the transmission station, the second propagation characteristics between each of the plurality of antennas and the reception station, and the noise power at the relay station, for example, through notification from the relay station. The information processing apparatus may, for example, calculate the interference power at the relay station through notification from the relay station or on the basis of information obtained from the relay station. The information processing apparatus may acquire the noise power at the reception station, for example, from a specified value held in advance, through notification from the reception station or using the noise power at the relay station as an approximate value.

In a case where the information processing apparatus calculates the interference power at the relay station, the information processing apparatus may calculate the interference power on the basis of the transmit power allowable value of the first signal at the relay station, the reduced amount of the interference power by the first filter and the third propagation characteristics between the one or more first antennas and the one or more second antennas. The transmit power allowable value of the first signal at the relay station, the reduced amount of the interference power by the first filter at the relay station and the third propagation characteristics between each of the plurality of antennas may be acquired, for example, through notification from the relay station.

Further, the information processing apparatus may create K first combinations, for the plurality of antennas, including one or more transmission antennas that transmit reference signals at the same time and one or more reception antennas that receive the reference signals transmitted at the same time from the one or more transmission antennas. The information processing apparatus may instruct the relay station to measure the third propagation characteristics for each of the K first combinations between each of the plurality of antennas through transmission and reception of the reference signals. The information processing apparatus may calculate the interference power at the relay station using measurement results of the third propagation characteristics between each of the plurality of antennas, received from the relay station. The K first combinations are similar to the K first combinations created by the above-described relay station.

Another aspect of the present disclosure may be specified as a method of the processing executed by the above-described relay station or the information processing apparatus, which is executed by a computer. Specifically, the method includes, by the computer, when a relay station including a plurality of antennas relays a first signal transmitted from a transmission station to a reception station without demodulating or decoding the first signal, and in a case where one or more first antennas among the plurality of antennas are set as reception antennas for the first signal, and one or more second antennas among the plurality of antennas are set as transmission antennas for the first signal after the relay, estimating an SINR of the first signal at the reception station after the relay on the basis of a transmit power of the first signal at the transmission station, first propagation characteristics between the one or more first antennas and the transmission station, second propagation characteristics between the one or more second antennas and the reception station, a noise power and an interference power at the relay station, and a noise power at the reception station, and determining the one or more first antennas and the one or more second antennas in a combination that makes the SINR maximum respectively as reception antennas that receive the first signal and transmission antennas that transmit the first signal after the relay.

Further, another aspect can be also specified as a program for causing a relay station or a control apparatus to execute the method, and a computer-readable non-transitory storage medium recording the program.

In the following, embodiments of the present disclosure will be described with reference to the drawings. The configuration of the embodiments described below are examples, and the present disclosure is not limited to the configuration of the embodiments.

First Embodiment

Figure 1:
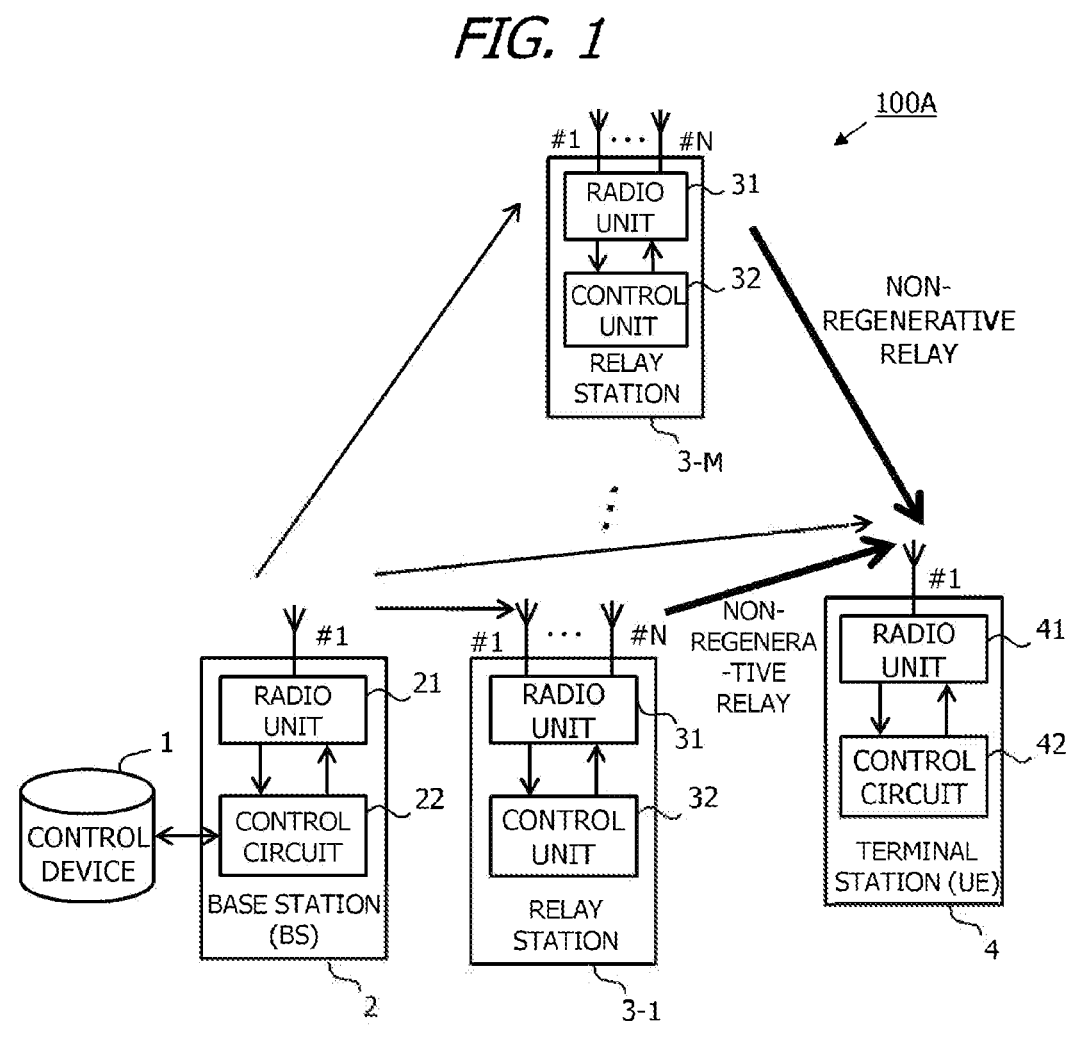

FIG. 1 is a diagram illustrating an example of a system configuration of a communication system 100A according to a first embodiment. The communication system 100A includes a control apparatus 1, a base station 2, a relay station 3 (3-1, . . . , 3-M), and a terminal station 4. The control apparatus 1 is an apparatus on a core network to which the base station 2 is connected. However, the control apparatus 1 can be considered as a core network itself or a system included in the core network. The core network includes, for example, an optical fiber network. The control apparatus 1 controls the base station 2, the relay station 3 and the terminal station 4 and provides a communication service to the terminal station 4.

The base station 2 provides a radio access network to the terminal station 4. An area where radio communication is possible in the radio access network is also referred to as a cell. In the first embodiment, the base station 2 includes one or more antennas (for example, #1), a transceiver 21 connected to these one or more antennas, and a control circuit 22. The control circuit 22 includes, for example, a processor and a memory. The processor controls communication with the control apparatus 1 and radio communication with the relay station 3 and the terminal station 4 by a computer program on the memory.

The terminal station 4 is, for example, a mobile station such as a smartphone, a tablet terminal, a wearable terminal and an in-vehicle data communication apparatus. However, the terminal station 4 is not limited to this and may be a stationary terminal apparatus. For example, the terminal apparatus is connected to the radio access network in a range of a cell provided by the base station 2. The relay station 3 relays radio communication between the base station 2 and the terminal station 4. The relay station 3 is, for example, a small base station, a mobile base station, an in-vehicle apparatus, a smartphone, or the like. In the first embodiment, the relay station 3 is an apparatus selected by the control apparatus 1 as the relay station among apparatuses having a configuration capable of performing non-regenerative relay.

Upon occurrence of a connection request from the terminal station 4, the control apparatus 1 selects one or more apparatuses located in the range of the cell provided by the base station 2 as the relay station 3 and instructs the relay station 3 to relay radio communication. Note that in the first embodiment, in a case where the plurality of relay stations 3 are individually distinguished from each other, branch numbers like relay stations 3-1, . . . , 3-M are assigned. Here, the branch number M is an integer indicating the number of the relay stations 3. FIG. 1 illustrates the relay stations 3-1 and 3-M as an example. However, in a case where the relay stations 3-1, . . . , 3-M are collectively referred, they are simply described as the relay station 3.

The relay station 3 includes a plurality of antennas (for example, #1, . . . , #N), a plurality of transceivers 31 respectively connected to these plurality of antennas, and a control unit 32. Note that FIG. 1 illustrates the plurality of transceivers 31 as one transceiver 31 for convenience sake.

The terminal station 4 includes one or more antennas (for example, #1), a transceiver 41 connected to the one or more antennas, and a control circuit 42. For example, as a result of a mobile station within the cell requesting connection to the radio access network to the base station 2 and being connected to the radio access network, the mobile station operates as the terminal station 4. The mobile station within the cell may request connection to the radio access network directly to the base station 2. Alternatively, the mobile station within the cell may request connection to the radio access network to the base station 2 via an apparatus that operates as the relay station 3 within the cell. The terminal station 4 can be regarded as a station that is capable of performing communication with the base station 2 via one of the one or more relay stations 3 or without interposition of any of the one or more relay stations 3.

FIG. 2 is a diagram illustrating an example of a system configuration of a communication system 100B. In the first embodiment, the system configuration of the communication system 100B may be employed. The communication system 100B includes a central base station 2A and one or more distributed base stations 2B in place of the base station 2 compared with the communication system 100A in FIG. 1. In a case where the one or more distributed base stations 2B are individually distinguished from each other, branch numbers like distributed base stations 2B-1, . . . , 2B-S are assigned. Here, the branch number S is an integer indicating the number of the distributed base stations. FIG. 2 illustrates the distributed base stations 2B-1 and 2B-S. However, in a case where the distributed base stations 2B-1, . . . , 2B-S are collectively referred, they are simply described as the distributed base station 2B.

The central base station 2A includes a control circuit 22A. Further, the distributed base station 2B includes a transceiver 21B. The control circuit 22A of the central base station 2A and the transceiver 21B of the distributed base station 2B are connected, for example, via an optical fiber C1 or a radio network. A topology of the optical fiber C1 that connects the central base station 2A and the plurality of distributed base stations 2B is not limited to a specific topology. For example, the topology of the optical fiber C1 may be one-to-one connection between nodes, a network that branches with distance from the central base station 2A, a star network, a ring network, or the like. Further, in a case where the control circuit 22A of the central base station 2A and the transceiver 21B of the distributed base station 2B are connected via a radio network, standards of the radio network to be employed, and protocol are not limited to particular ones.

The control circuit 22A includes a processor and a memory in a similar manner to the control circuit 22 in FIG. 1. The processor controls communication with the control apparatus 1 and radio communication with the relay station 3 and the terminal station 4 by a computer program on the memory. In other words, the control circuit 22A controls radio communication with the relay station 3 and the terminal station 4 via the transceivers 21B of the one or more distributed base stations 2B.

Note that in the communication system 100A and the communication system 100B, the control unit 32 of the relay station may include an antenna for a control channel separately from the antenna #1 to the antenna N. Hereinafter, in a case where the communication system 100A and the communication system 100B are not distinguished from each other, they will be simply described as a communication system 100.

In the first embodiment, it is assumed that the following is employed in the communication system 100. In the communication system 100, the same frequency channel is used in uplink and downlink in a time-division multiplexing manner. Further, a slot timing of a radio frame is synchronized among the base station 2, the relay station 3 and the terminal station 4. In the communication system 100, a block transmission scheme such as cyclic prefix-orthogonal frequency division multiplexing (CP-OFDM), having a cyclic prefix is employed as a radio modulation scheme. Further, a relay station 3 has resource block information, which is shared, to be used in uplink and downlink by a terminal station 4 that is the target of relay. Note that the uplink is a link in a direction from the terminal station 4 to the base station 2. The downlink is a link in a direction from the base station 2 to the terminal station 4. In the first embodiment, a case will be described as an example where non-regenerative relay is performed in a downlink direction. In other words, in the first embodiment, the transmission station is the base station 2, and the reception station is the terminal station 4. In the following description, there is a case where the downlink direction is referred to as a downbound direction, and the uplink direction is referred to as an upbound direction.

In the first embodiment, the relay station 3 determines the reception antenna and the transmission antenna to be used for non-regenerative relay so that the SINR of the received signal at the terminal station 4 becomes maximum. The relay station 3 creates combinations of the first antennas to be used as the reception antennas in non-regenerative relay and the second antennas to be used as the transmission antennas in non-regenerative relay among the plurality of antennas and estimates an SINR of the received signal at the terminal station 4 for each of all the combinations. The SINR at the terminal station 4 is estimated using a parameter that can be measured by the relay station 3. This enables the relay station 3 to determine the reception antenna and the transmission antenna to be used for non-regenerative relay that make the SINR of the received signal at the terminal station 4 maximum without feedback of the SINR from the terminal station 4.

Figure 3:
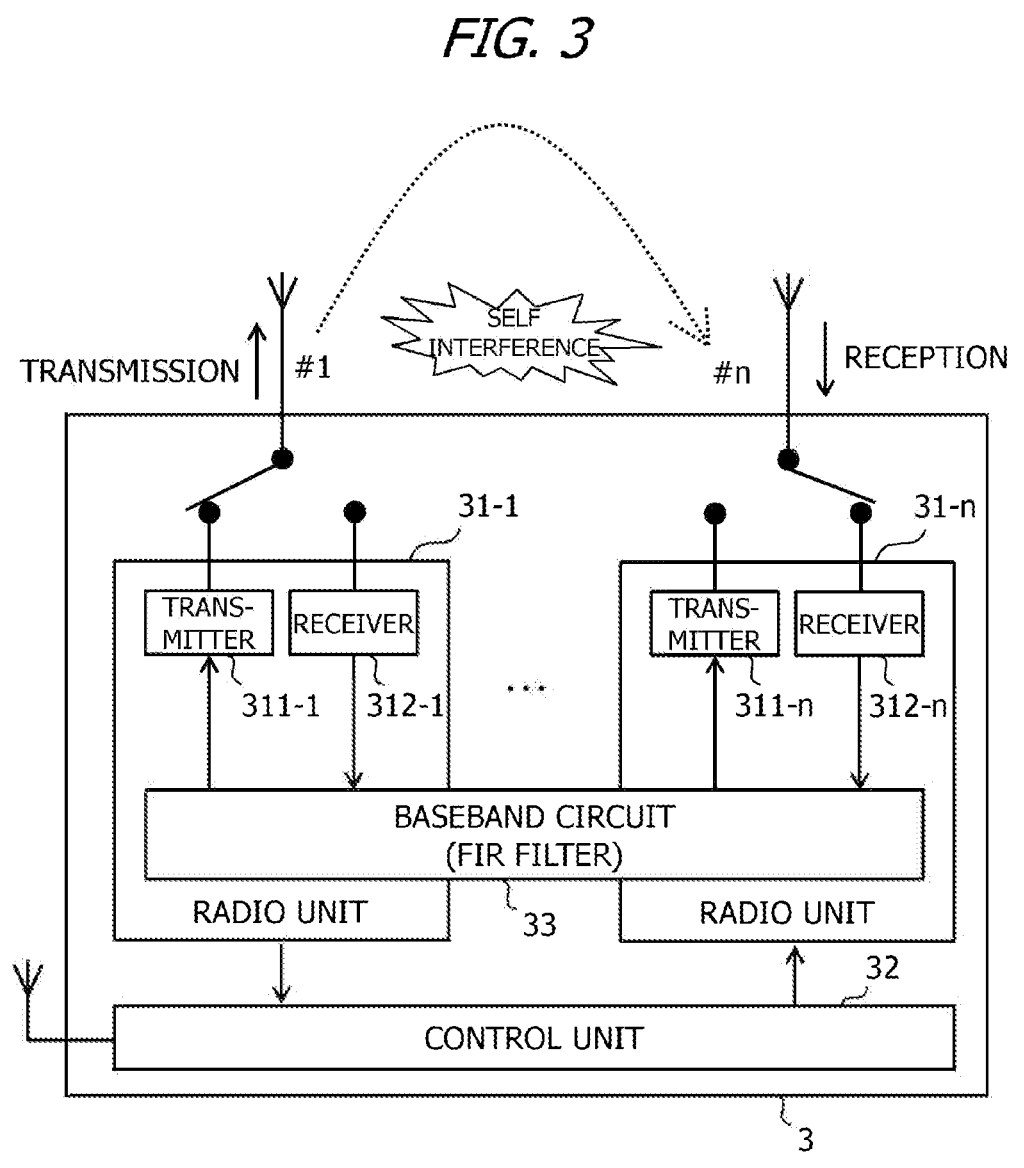

FIG. 3 is a diagram illustrating an example of a hardware configuration of the relay station 3. The relay station 3 includes transceivers 31-1, . . . , 31-N, the control unit 32 and a baseband circuit 33. The transceivers 31-1, . . . , 31-N are respectively connected to the antennas #1, . . . , N. In other words, the transceivers 31 of the number equal to the number of antennas are provided. In a case where the transceivers 31-1, . . . , 31-N are collectively referred, they are simply described as a transceiver 31. The transceiver 31 includes a transmitter 311 and a receiver 312.

The transceiver 31 is connected to the antenna via a switch. In a case where the antenna is used as the transmission antenna, the switch is connected to the transmitter 311, thereby the antenna is connected to the transmitter 311. In a case where the antenna is used as the reception antenna, the switch is connected to the receiver 312, thereby the antenna is connected to the receiver 312. In each transceiver 31, connection of the switch is switched in accordance with an instruction from the control unit 32.

Here, a power difference between the transmission signal and the received signal is, for example, about 100 dB. Part of the transmission signal interferes with the received signal. Interference between part of the transmission signal and the received signal at the transceiver 31 is referred to as self interference. The self interference is reduced by using a radio frequency (RF) analog filter within the receiver 312 and an FIR filter within the baseband circuit 33 in conjunction with each other.

The receiver 312 receives the received signal from the antenna in a case where the receiver 312 is connected to the antenna by the switch. The receiver 312 includes a quadrature detection circuit and an analog-to-digital (AD) converter. The receiver 312 down-converts the received signal by the quadrature detection circuit and further converts the down-converted received signal into digital data by the AD converter to obtain a baseband signal. The receiver 312 outputs the obtained baseband signal to the baseband circuit 33.

The baseband circuit 33 includes an FIR filter. The baseband circuit 33 reduces the transmission signal that is mixed in the received signal and causes self interference, by the FIR filter and delays the received signal by a predetermined delay period. The baseband circuit 33 outputs the received signal filtered by the FIR filter to the transmitter 311 of the transceiver 31 corresponding to the transmission antenna.

The transmitter 311 includes a digital-to-analog (DA) converter, a modulation circuit and an amplification circuit. The transmitter 311 receives input of the received signal from the baseband circuit 33 in a case where the transmitter 311 is connected to the antenna by the switch. The transmitter 311 converts the received signal from the baseband circuit 33 into an analog signal and generates an RF signal by the modulation circuit. Further, the transmitter 311 amplifies power (amplitude) of the RF signal by the amplification circuit. The transmitter 311 transmits the RF signal as the relay signal from the antenna to which the transmitter 311 is connected by the switch.

The control unit 32 is, for example, a processor such as a CPU or an arithmetic circuit such as an FPGA. The control unit 32 controls non-regenerative relay. More specifically, the control unit 32 measures radio propagation characteristics of a propagation path, notifies the control apparatus 1 of the measurement result, sets the FIR filter and determines the reception antenna and the transmission antenna to be used for non-regenerative relay. The control unit 32 is an example of the "controller" of the "relay station".

Note that the hardware configuration of the relay station 3 is not limited to the configuration illustrated in FIG. 3. For example, while in FIG. 3, the relay station 3 includes an antenna for a control channel connected to the control unit 32 separately from the antenna #1 to the antenna #N, the configuration is not limited to this. For example, the relay station 3 may use one of the antenna #1 to the antenna #N as the antenna for the control channel without the antenna for the control channel being provided at the control unit 32.

<Estimation of SINR at Terminal Station 4>

First, a case will be described where one reception antenna and one transmission antenna to be used for non-regenerative relay at the relay station 3 are selected.

Figure 4:
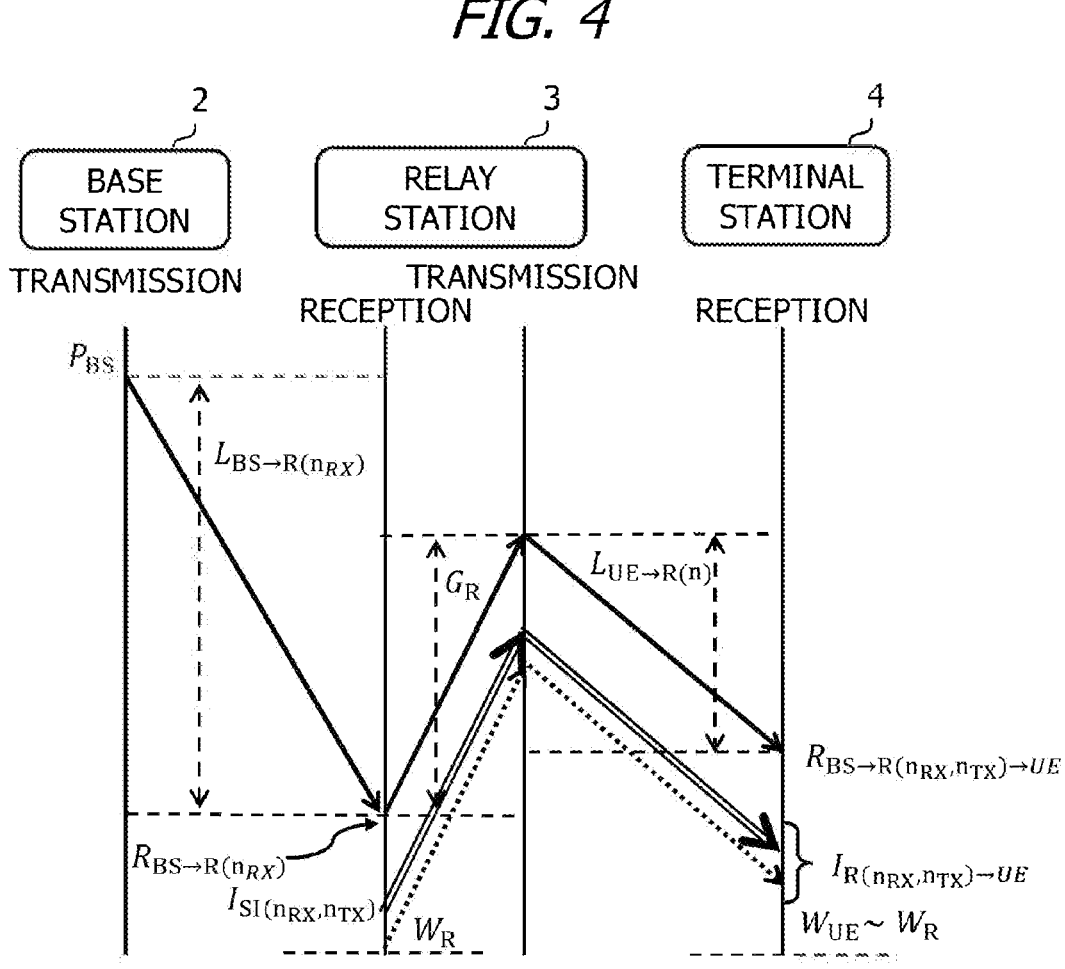
FIG. 4 is a diagram indicating power of a signal at each apparatus and a value that becomes a parameter to be used for calculation of the SINR in a case where non-regenerative relay is performed at the relay station.

FIG. 4 is a diagram indicating power of a signal at each apparatus and a value that becomes a parameter to be used for calculation of the SINR in a case where non-regenerative relay is performed at the relay station 3. Unit of each value indicated in FIG. 4 is decibel (dB). Further, in FIG. 4, it is assumed that one reception antenna and one transmission antenna are used for non-regenerative relay at the relay station 3. Hereinafter, mere description of the received signal, the transmission signal, the received signal power and the transmission signal power indicates ones regarding a data signal transmitted from the base station 2.

A signal transmitted from the base station 2 to the terminal station 4 attenuates on a propagation path from the base station 2 to the relay station 3 and reaches the relay station 3. When propagation characteristics from the base station 2 to the relay station 3 are expressed as H_(BS→R(n_(RX))), a propagation loss L (BS→R(n_(RX))) on the propagation path from the base station 2 to the relay station 3 can be expressed with the following expression 1. Note that character strings in brackets after underlines are indicated with subscripts in the drawings and the expressions. The term n_(RX) indicates an identification number of an antenna to be used as the reception antenna for non-regenerative relay at the relay station 3.

$$L_{BS \to R(n_{RX})} = -20 \log_{10}|H_{BS \to R(n_{RX})}| \quad \text{(expression 1)}$$

The received signal power at the relay station 3 can be expressed using the following expression 2 obtained by subtracting the propagation loss L_(BS→R(n_(RX))) on the propagation path from the base station 2 to the relay station 3 from the transmission signal power P_(BS) at the base station 2.

Received Signal Power from Base Station at Relay Station $$R_{BS \to R(n_{RX})} = P_{BS} - L_{BS \to R(n_{RX})} = P_{BS} + 20 \log_{10}|H_{BS \to R(n_{RX})}| \quad \text{(expression 2)}$$

At the relay station 3, self interference occurs by part of the transmission signal in non-regenerative relay. The interference power I_(SI(n_(TX), n_(RX))) at the relay station 3 can be expressed with the following expression 3. The term H_(R(n_(TX))→R(n_(RX))) is propagation characteristics between the transmission antenna n_(TX) and the reception antenna n_(RX). The term P_(IS) is a reduced amount of self interference power by the baseband circuit 33.

Interference Power at Relay Station $$I_{SI(n_{TX},n_{RX})} = P_R + 20 \log_{10}|H_{R(n_{TX}) \to R(n_{RX})}| - P_{IS} \quad \text{(expression 3)}$$

At the relay station 3, the received signal is amplified with an amplification gain G_(R) when relayed. The gain amplification G_(R) at the relay station 3 can be expressed with the following expression 4. The term P_(R) is an allowable value of the transmission signal power at the relay station 3. The term W_(R) is the noise power at the relay station 3.

Amplification Gain at Relay Station $$G_R = P_R - \left(10 \log_{10}\left(10^{(R_{BS \to R(n_{RX})})/10} + 10^{(I_{SI(n_{RX},n_{TX})})/10} + 101^{(W_R/10)}\right)\right) \quad \text{(expression 4)}$$

The received signal power R (BS→R(n_(RX), n_(TX))→UE) in a case where the relay signal transmitted from the relay station 3 is received at the terminal station 4 can be expressed with the following expression 5 using the amplification gain G_(R). The term L (UE→R(n_(TX))) indicates a propagation loss between the transmission antenna of the relay station 3 and the terminal station 4. The term H_(UE→R(n_(TX))) indicates propagation characteristics between the transmission antenna of the relay station 3 and the terminal station 4.

Received Signal Power at Terminal Station Corresponding to Relay Signal from Relay Station $$R_{BS \to R(n_{RX},n_{TX}) \to UE} = R_{BS \to R(n_{RX})} + G_R - L_{UE \to R(n_{TX})} = R_{BS \to R(n_{RX})} + G_R + 20\log_{10}|H_{UB \to R(n_{TX})}| \quad \text{(expression 5)}$$

The interference power I_(SI(n_(TX), n_(RX))) and the noise power W_(R) at the relay station 3 are amplified with the amplification gain G_(R) along with the relay signal and reaches the terminal station 4 as an interference signal. The interference power I_(R(n_(RX), n_(TX))→UE) in a case where the interference signal transmitted from the relay station 3 is received at the terminal station 4 can be expressed with the following expression 6 using the amplification gain G_(R). Note that a variable of a logarithm to base 10 in the first item in the expression 6 is a value obtained by converting unit of a total value of the interference power I_(SI(n_(TX), n_(RX))) and a noise power W_(R) at the relay station 3 from decibel into watt.

Received Signal Power at Terminal Station Corresponding to Interference Signal from Relay Station $$I_{R(n_{RX},n_{TX}) \to UE} = 10\log_{10}\left(10^{\frac{I_{SI(n_{RX},n_{TX})}}{10}} + 10^{\frac{W_R}{10}}\right) + G_R - L_{UE \to R(n_{TX})} \quad \text{(expression 6)}$$

The SINR is obtained by converting unit of a value obtained by dividing the received signal power (W) by a sum of the interference signal power (W) and the noise power (W) into decibel. Thus, the SINR Γ_(BS→R(n_(RX), n_(TX))) at the terminal station 4 can be expressed with the following expression 7. The term W_(UE) is the noise power (W) at the terminal station 4.

Signal-to-Interference Noise Power Ratio at Terminal Station $$\Gamma_{BS \to R(n_{RX}, n_{TX}) \to UE} = R_{BS \to R(n_{RX}, n_{TX}) \to UE} - \\ 10\log_{10}\left(10^{\frac{I_{R(n_{RX}, n_{TX}) \to UE}}{10}} + 10^{\frac{W_{UE}(\sim W_R)}{10}}\right) \quad \text{(expression 7)}$$

In the first embodiment, the relay station 3 estimates the SINR at the terminal station 4 using the expression 7. The control unit 32 of the relay station 3 creates combinations of (one) reception antenna and (one) transmission antenna among the plurality of antennas in a case where non-regenerative relay is performed. The control unit 32 calculates the SINR at the terminal station 4 in accordance with the expression 1 to the expression 7 for each of all the combinations. The control unit 32 determines to use antennas included in the combination that makes the SINR at the terminal station 4 maximum, in non-regenerative relay.

A method for acquiring each parameter in the expression 1 to the expression 7 by the relay station 3 will be described next. The relay station 3 acquires the transmission signal power P_(BS) at the base station 2 through notification from the base station 2 through the control channel prior to transmission of the data signal from the base station 2 to the terminal station 4. The allowable value P_(R) of the transmission signal power at the relay station 3, the reduced amount P_(IS) of the self interference power and the noise power W_(R) are values set in advance or measured. These values are values regarding the relay station 3 itself, and thus, the relay station 3 holds the values, for example, in the memory, or the like, within the control unit 32.

The propagation characteristics H_(BS→R(n_(RX))) between the base station 2 and the reception antenna n_(RX), the propagation characteristics H_(R(n_(TX))→UE) between the transmission antenna n_(TX) and the terminal station 4, and the propagation characteristics H_(R(n_(TX))→UE) between the transmission antenna n_(TX) and the reception antenna n_(RX) are acquired by being measured by the relay station 3. The relay station 3 is unable to measure the noise power W_(UE) at the terminal station 4. Thus, the relay station 3 uses the noise power W_(R) at the relay station 3 as an approximate value of the noise power W_(UE) at the terminal station 4. Note that it is specified in the 5G standards that the relay station and the terminal station have equivalent reception performance, and thus, the noise power W_(UE) at the terminal station 4 can be approximated by the noise power W_(R) at the relay station 3.

The expression 1 to the expression 7 are expressions in a case where one reception antenna and one transmission antenna are used in non-regenerative relay. However, a plurality of reception antennas and a plurality of transmission antennas may be used in non-regenerative relay. In a case where a plurality of reception antennas and a plurality of transmission antennas are used in non-regenerative relay, the expression 2 to the expression 7 described above are generalized and expressed by the following expression 2G to expression 7G. In the expression 2G to the expression 7G, the reception antenna n_(RX) and the transmission antenna n_(TX) are indicated as vectors having candidate antenna identification numbers as elements. Further, each of the propagation characteristics H is indicated as a channel matrix H. The term N_(RX) indicates the number of reception antennas to be used in non-regenerative relay. The term N_(TX) is the number of transmission antennas to be used in non-regenerative relay.

Received Signal Power at Relay Station with Respect to Base Station Transmission Signal $$R_{BS \to R(n_{RX})} = P_{BS} + \sum_{k=1}^{N_{RX}} 20\log_{10}\left|H_{BS \to R(n_{RX}(R))}\right| \quad \text{(expression 2G)}$$

Interference Power at Relay Station $$I_{SI(n_{TX}, n_{RX})} = \\ P_R - P_{IS} + \sum_{k=1}^{N_{RX}} \sum_{j=1}^{N_{TX}} 20\log_{10}\left|H_{R(n_{TX}(l)) \to R(n_{RX}(k))}\right| \quad \text{(expression 3G)}$$

Amplification Gain at Relay Station $$G_R = P_R - \\ \left(10\log_{10}\left(10^{(R_{BS \to R(n_{RX})}/10)} + 10^{(I_{SI(n_{RX}, n_{TX})}/10)} + 10^{(W_R/10)}\right)\right) \quad \text{(expression 4G)}$$

Received Signal Power at Terminal Station Corresponding to Relay Signal from Relay Station $$R_{BS \to R(n_{RX}, n_{TX}) \to UE} = \\ R_{BS \to R(n_{RX})} + G_R + \sum_{l=0}^{N_{TX}} 20\log_{10}\left|H_{UE \to R(n_{TX}(l))}\right| \quad \text{(expression 5G)}$$

Received Signal Power Ratio at Terminal Station Corresponding to Interference Signal from Relay Station $$I_{R(n_{RX}, n_{TX}) \to UE} = 10\log_{10}\left(10^{\frac{I_{SI(n_{RX}, n_{TX})}}{10}} + \\ 10^{\frac{W_R}{10}}\right) + G_R + \sum_{l=1}^{N_{TX}} 20\log_{10}\left|H_{UE \to R(n_{TX}(l))}\right| \quad \text{(expression 6G)}$$

Signal-to-Interference Noise Power at Terminal Station $$\Gamma_{BS \to R(n_{RX}, n_{TX}) \to UE} = R_{BS \to R(n_{RX}, n_{TX}) \to UE} - \\ 10\log_{10}\left(10^{\frac{I_{R(n_{RX}, n_{TX}) \to UE}}{10}} + 10^{\frac{W_{UE}(\sim W_R)}{10}}\right) \quad \text{(expression 7G)}$$

(Promotion in Efficiency of Measurement of Propagation Characteristics Between Antennas)

In the first embodiment, in a case where propagation characteristics between each of the plurality of antennas of the relay station 3 are measured, the processing is made efficient by transmitting reference signals that are orthogonal to each other from a plurality of transmission antennas at the same time in a manner of multiple-input and multiple-output (MIMO) and receiving the reference signals at a plurality of reception antennas. Hereinafter, a combination of the transmission antenna and the reception antenna for the reference signal when the propagation characteristics between the antennas are measured will be referred to as a combination for measurement. The combination for measurement is an example of the "first combination".

Figure 5:
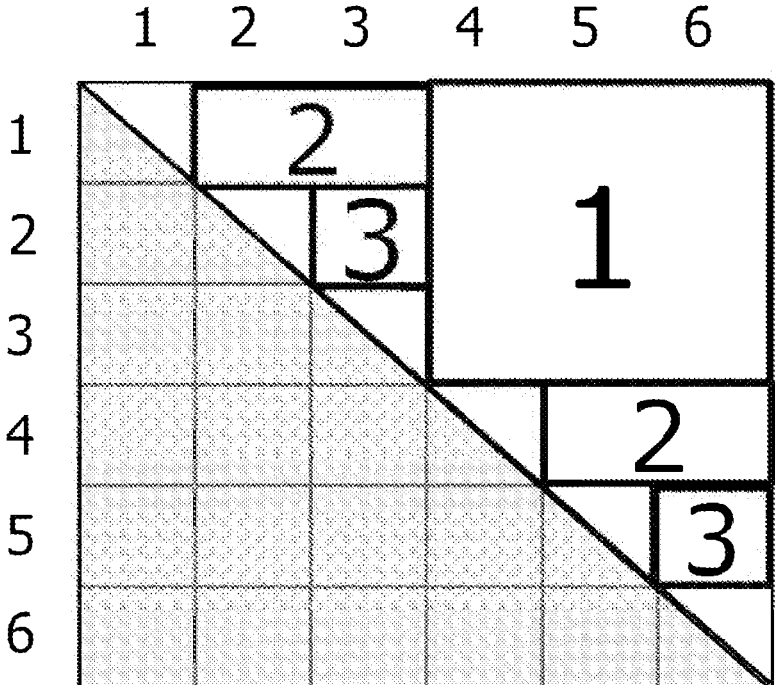
FIG. 5 is a diagram illustrating a method for creating the combinations for measurement in a case where the relay station includes six antennas.

FIG. 5 is a diagram illustrating a method for creating the combinations for measurement in a case where the relay station 3 includes six antennas. FIG. 5 illustrates 6×6 boxes indicating antennas to be allocated as the transmission antennas for the reference signals in a vertical direction and antennas to be allocated as the reception antennas for the reference signals in a horizontal direction. For example, propagation characteristics between the transmission antenna #x and the reception antenna #y and propagation characteristics between the transmission antenna #y and the reception antenna #x are dealt with as being the same because there is symmetry between the propagation characteristics, and thus, combinations corresponding to hatched boxes in a lower half triangular range illustrated in FIG. 5 are excluded.

For example, in a blank portion in an upper half triangular range of the 6×6 boxes illustrated in FIG. 5, quadrangles having a larger area are sequentially and repeatedly created by combining the boxes. Then, quadrangles having the same shape are grouped. In the 6×6 boxes illustrated in FIG. 5, three groups can be created. The groups are, in descending order of the area of the quadrangle, a group #1 (the transmission antennas: #1, #2 and #3, the reception antennas: #4, #5 and #6), a group #2 (the transmission antennas #1 and #4, the reception antennas #2, #3, #5 and #6), and a group #3 (the transmission antennas: #2 and #5, the reception antennas: #3 and #6). These groups are set as the combinations for measurement. The reference signal is transmitted and received for each of the combinations for measurement. Thus, in a case where there are six antennas, processing of transmitting and receiving the reference signal for measuring the propagation characteristics between antennas merely needs to be performed a total of three times, which is the same number as the number of the combinations for measurement.

Figure 6:
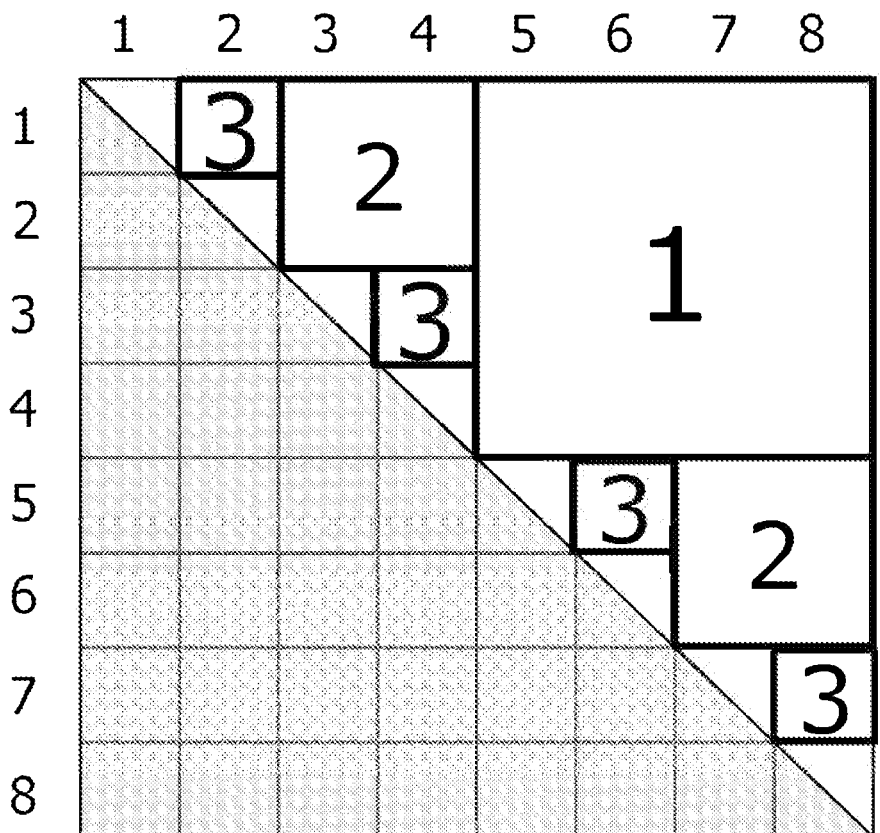
FIG. 6 is a diagram illustrating a method for creating the combinations for measurement in a case where the relay station includes eight antennas.

FIG. 6 is a diagram illustrating a method for creating the combinations for measurement in a case where the relay station 3 includes eight antennas. In a similar manner to FIG. 5, quadrangles having a larger area in the blank portion are sequentially and repeatedly created, and the quadrangles having the same shape are grouped, thereby three groups can be created as illustrated in FIG. 6. The groups are, in descending order of the area of the quadrangle, a group #1 (the transmission antennas: #1, #2, #3 and #4, the reception antennas: #5, #6, #7 and #8), a group #2 (the transmission antennas: #1, #2, #5 and #6, the reception antennas: #3, #4, #7 and #8), and a group #3 (the transmission antennas: #1, #3, #5 and #7, the reception antennas: #2, #4, #6 and #8). Thus, in a case where there are eight antennas, processing of transmitting and receiving the reference signal for measurement of propagation characteristics between antennas merely needs to be performed a total of three times, which is the same number as the number of the combinations for measurement.

In view of the examples illustrated in FIG. 5 and FIG. 6, the number of times of execution of the processing of transmitting and receiving the reference signal to measure propagation characteristics between antennas and the number of combinations for measurement K are expressed with the following expression 8 where the number of antennas is N. In other words, K is a value obtained by rounding out, to the decimal point, a logarithm of the number of antennas N to base 2.

$$K = \text{ceil}(\log_2 N) \qquad \text{(expression 8)}$$

The control unit 32, for example, creates K combinations for measurement as described in FIGS. 5 and 6. The control unit 32 transmits a reference signal from the antenna allocated as the transmission antenna and receives the reference signal at the antenna allocated as the reception antenna for each of the K combinations for measurement. The control unit 32 measures propagation characteristics on the basis of the reference signal received from each antenna allocated as the transmission antenna for each antenna allocated as the reception antenna. This enables the control unit 32 to measure propagation characteristics between the two antennas for all combinations of two antennas selected among the plurality of antennas. Note that the transmit power of the reference signal is a specified value.

Note that in FIGS. 5 and 6, K combinations for measurement are created by sequentially creating quadrangles constituted with boxes so as to each have the largest area in a blank portion in the upper half triangle of the box for the number of antennas N×N. However, a method for creating K combinations for measurement is not limited to this method. For example, K combinations for measurement may be created by sequentially creating squares constituted with boxes so as to each have the largest area in a blank portion in the upper half triangle of the box for the number of antennas N×N. For example, K combinations for measurement may be created by sequentially creating quadrangles constituted with boxes so as to each have a larger size in the transmission antenna direction (vertical direction) or have a larger size in the reception antenna direction (horizontal direction) in a blank portion in the upper half triangle of the box for the number of antennas N×N.

In other words, the K combinations for measurement merely need to be created so that combinations of two antennas of the antenna #A and the antenna #B among the plurality of antennas do not overlap with each other as the transmission antenna and the reception antenna, and as the reception antenna and the transmission antenna among the K combinations for measurement.

<Processing Flow>

Figure 7:
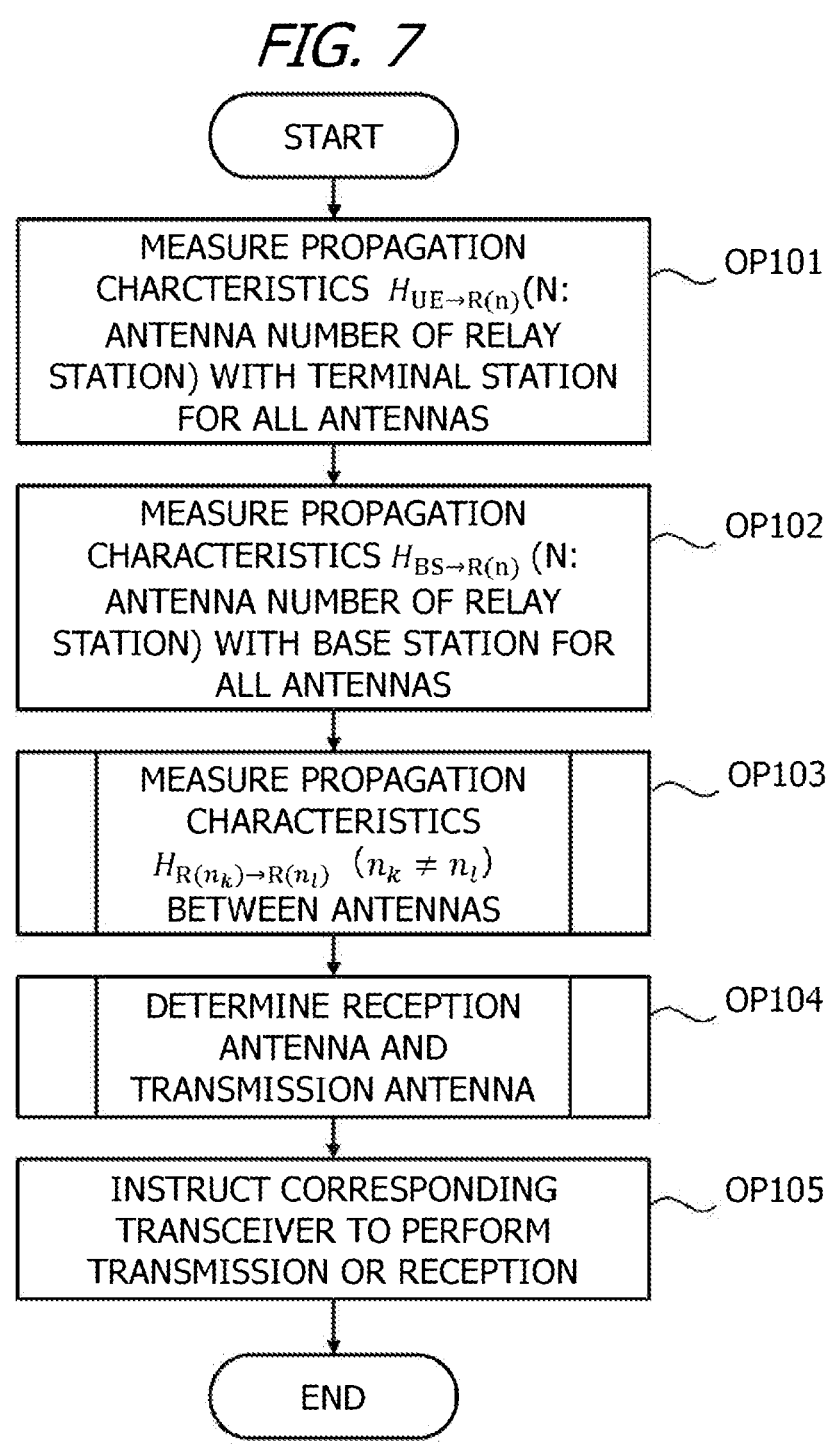
FIG. 7 is an example of a flowchart of processing of determining the reception antenna and the transmission antenna to be used for non-regenerative relay of the relay station.

FIG. 7 is an example of a flowchart of processing of determining the reception antenna and the transmission antenna to be used for non-regenerative relay of the relay station 3. The processing indicated in FIG. 7 is repeatedly executed for each radio frame, for example, from when an instruction of relay start is received from the base station 2 through the control channel until when the instruction of relay end is received. The instruction of relay start from the base station 2 is transmitted, for example, in a case where the base station 2 receives a connection request from the terminal station 4. The instruction of relay end from the base station 2 is transmitted, for example, in a case where communication of the terminal station 4 ends.

In OP101, the control unit 32 measures propagation characteristics H_(UE→R(n)) with the terminal station 4 for all antennas. The number n indicates an identification number of the antenna and, for example, takes a value from 1 to N. The propagation characteristics H_(UE→R(n)) with the terminal station 4 are, for example, measured on the basis of the reference signal transmitted from the terminal station 4 and received at all the antennas through the control channel. Note that the transmit power of the reference signal transmitted from the terminal station 4 is known.

In OP102, the control unit 32 measures propagation characteristics H_(BS→R(n)) with the base station 2 for all antennas. The propagation characteristics H_(BS→R(n)) with the base station 2 are measured on the basis of the reference signal transmitted from the base station 2 and received at all the antennas through the control channel. Note that the transmit power of the reference signal transmitted from the base station 2 is known.

In OP103, the control unit 32 measures propagation characteristics H_(R(n_(k))→R(n_(l))) between antennas. The terms n_(k) and n_(l) indicate identification numbers of the antennas and n_(k)≠n_(l). Processing of measuring the propagation characteristics between antennas in OP103 will be described in detail later.

In OP104, the control unit 32 determines the transmission antenna and the reception antenna to be used for non-regenerative relay. Processing of determining the transmission antenna and the reception antenna to be used for non-regenerative relay in OP104 will be described in detail later.

In OP105, the control unit 32 instructs the transceivers 31 respectively corresponding to the antenna selected as the transmission antenna and the antenna selected as the reception antenna in OP104 to perform transmission or reception. Thereafter, the processing indicated in FIG. 7 ends. Then, the relay station 3 performs non-regenerative relay using the reception antenna and the transmission antenna selected in OP104 for the data signal transmitted from the base station 2.

FIG. 8 is an example of a flowchart of processing of measuring propagation characteristics between antennas of the relay station 3. The processing indicated in FIG. 8 corresponds to the processing in OP103 in FIG. 7.

In OP201, the control unit 32 creates K combinations for measurement of antennas. The number K is obtained using the above-described expression 8. The K combinations for measurement are created, for example, using the method described with FIGS. 5 and 6.

The processing from OP202 to OP204 is executed for each of the K combinations for measurement. In other words, the processing from OP202 to OP204 is performed K times.

In OP202, the control unit 32 causes one or more transceivers 31 corresponding to one or more antennas allocated as the transmission antennas in a target combination for measurement to transmit the reference signal from the one or more antennas through the control channel.

In OP203, the control unit 32 causes one or more transceivers 31 corresponding to one or more antennas allocated as the reception antennas in the target combination for measurement to receive the reference signal transmitted in OP202.

In OP204, the control unit 32 measures propagation characteristics H_(R(n_(k))→R(n_(l))) between the one or more antennas allocated as the transmission antennas in the target combination for measurement and the one or more antennas allocated as the reception antennas in the target combination for measurement on the basis of the reference signal received in OP203.

If the processing from OP202 to OP204 ends for the K combinations for measurement, the processing proceeds to OP104 in FIG. 7.

FIG. 9 is an example of a flowchart of processing of determining the transmission antenna and the reception antenna to be used for non-regenerative relay at the relay station 3. The processing indicated in FIG. 9 corresponds to the processing in OP104 in FIG. 7.

In OP301, the control unit 32 creates combinations of the transmission antennas and the reception antennas to be used for non-regenerative relay. The number of the transmission antennas and the number of the reception antennas may be determined in advance or may be all numbers that can be taken within a range of the number of antennas provided at the relay station 3.

The processing from OP302 to OP303 is performed for all the combinations created in OP301. In OP302, the control unit 32 calculates the amplification gain G_(R) at the relay station 3 on the basis of the above-described expression 4 or expression 4G for the target combination. In OP303, the control unit 32 calculates the SINR of the received signal at the terminal station 4 on the basis of the above-described expression 7 or expression 7G for the target combination. If the SINR of the received signal at the terminal station 4 is calculated for all the combinations created in OP301, the processing proceeds to OP304.

In OP304, the control unit 32 selects a combination that makes the SINR of the received signal at the terminal station 4 maximum. Then, the processing indicated in FIG. 9 ends, and the processing proceeds to OP105 in FIG. 7.

Selection of the reception antenna and the transmission antenna to be used for non-regenerative relay by the relay station 3 upon downlink communication from the base station 2 to the terminal station 4 has been described above. The present disclosure is not limited to this, and the relay station 3 can select the reception antenna and the transmission antenna to be used for non-regenerative relay in a similar manner upon uplink communication from the terminal station 4 to the base station 2. In a case of uplink communication, the terminal station 4 becomes the transmission station, and the base station 2 becomes the reception station. Thus, the technique of determining the reception antenna and the transmission antenna to be used for non-regenerative relay at the relay station 3 described above can be applied to uplink communication by the base station 2 being replaced with the terminal station 4 and the terminal station 4 being replaced with the base station 2.

Upon uplink communication, a transmit power of the terminal station 4 that is the transmission station is, for example, acquired by a notification being made from the control apparatus 1 through the control channel. A value of a noise power at the base station 2 specified in the 5G standards may be used as a noise power at the base station 2 that is the reception station without using a noise power at the relay station 3 as an approximate value.

Operations and Effects of First Embodiment

In the first embodiment, the relay station 3 estimates the SINR of the received signal at the terminal station 4 that is the reception station and determines the reception antenna and the transmission antenna to be used for non-regenerative relay so that the SINR becomes maximum. By this means, it is possible to efficiently provide stable radio communication without feedback of the SINR from the terminal station 4 that is the reception station.

Further, in the first embodiment, the relay station 3 acquires the propagation characteristics with the base station 2, the propagation characteristics with the terminal station 4 and the propagation characteristics between antennas by performing measurement using the reference signal. The relay station 3 uses the noise power at the relay station 3 as an approximate value of the noise power at the terminal station 4 as the reception station. In other words, the relay station 3 can determine the reception antenna and the transmission antenna to be used for non-regenerative relay all by itself without particularly using communication with the base station 2 and the terminal station 4 for determining the reception antenna and the transmission antenna to be used for non-regenerative relay. This makes it possible to achieve reduction in processing load related to determination of the reception antenna and the transmission antenna to be used for non-regenerative relay and reduction in a processing period.

Further, in the first embodiment, combinations for measurement of the transmission antennas and the reception antennas for the reference signal are created so as to make the number of times of processing of transmission and reception of the reference signal less when the relay station 3 measures propagation characteristics between antennas. This makes it possible to achieve reduction in processing load related to measurement of the propagation characteristics between antennas and reduction in a processing period, which can eventually achieve reduction in processing load in the whole processing of determining the reception antenna and the transmission antenna to be used for non-regenerative relay and reduction in the processing period.

Second Embodiment

While in the first embodiment, the relay station 3 itself determines the reception antenna and the transmission antenna to be used for non-regenerative relay, in the second embodiment, the control apparatus 1 determines the reception antenna and the transmission antenna to be used for non-regenerative relay at the relay station 3. In the second embodiment, description in common with the first embodiment will be omitted.

A determination method in a case where the control apparatus 1 determines the reception antenna and the transmission antenna to be used for non-regenerative relay at the relay station 3 in the second embodiment is similar to the method described in the first embodiment. When the control apparatus 1 determines the reception antenna and the transmission antenna to be used for non-regenerative relay at the relay station 3, the control apparatus 1 notifies the relay station 3 of the antennas through the control channel.

In the second embodiment, the control apparatus 1 is unable to measure propagation characteristics between each antenna of the relay station 3 and the base station 2, propagation characteristics between each antenna of the relay station 3 and the terminal station 4, and propagation characteristics between the antennas of the relay station 3. Thus, the control apparatus 1 instructs the relay station 3 to measure these propagation characteristics and acquires these propagation characteristics from the relay station 3.

Further, in a case of downlink communication, the control apparatus 1 is unable to acquire a noise power at the terminal station 4 that is the reception station. Thus, the control apparatus 1 may, for example, cause the relay station 3 to make a notification of the noise power at the relay station 3 along with the measurement result of various kinds of propagation characteristics and use the noise power at the relay station 3 as an approximate value of the noise power at the terminal station 4. Further, the control apparatus 1 may acquire the allowable value of the transmission signal power at the relay station 3 and the reduced amount of self interference power at the relay station 3 from the relay station 3 through the control channel prior to the data signal or may receive a notification along with various kinds of propagation characteristics. Further, the control apparatus 1 may acquire the transmission signal power at the base station 2 as the transmission station from the base station 2 or may use a value set in advance.

In a case of uplink communication, the control apparatus 1 uses, for example, a value of a noise power at the base station 2 specified in the 5G standards as the noise power at the base station 2 that is the reception station. Further, the control apparatus 1 may acquire the allowable value of the transmission signal power at the relay station 3 and the reduced amount of self interference power at the relay station 3 from the relay station 3 through the control channel prior to the data signal or may receive a notification along with various kinds of propagation characteristics. Further, the control apparatus 1 may acquire the transmission signal power at the terminal station 4 as the transmission station from the terminal station 4 through the control channel or may use a value set in advance.

Figure 10:
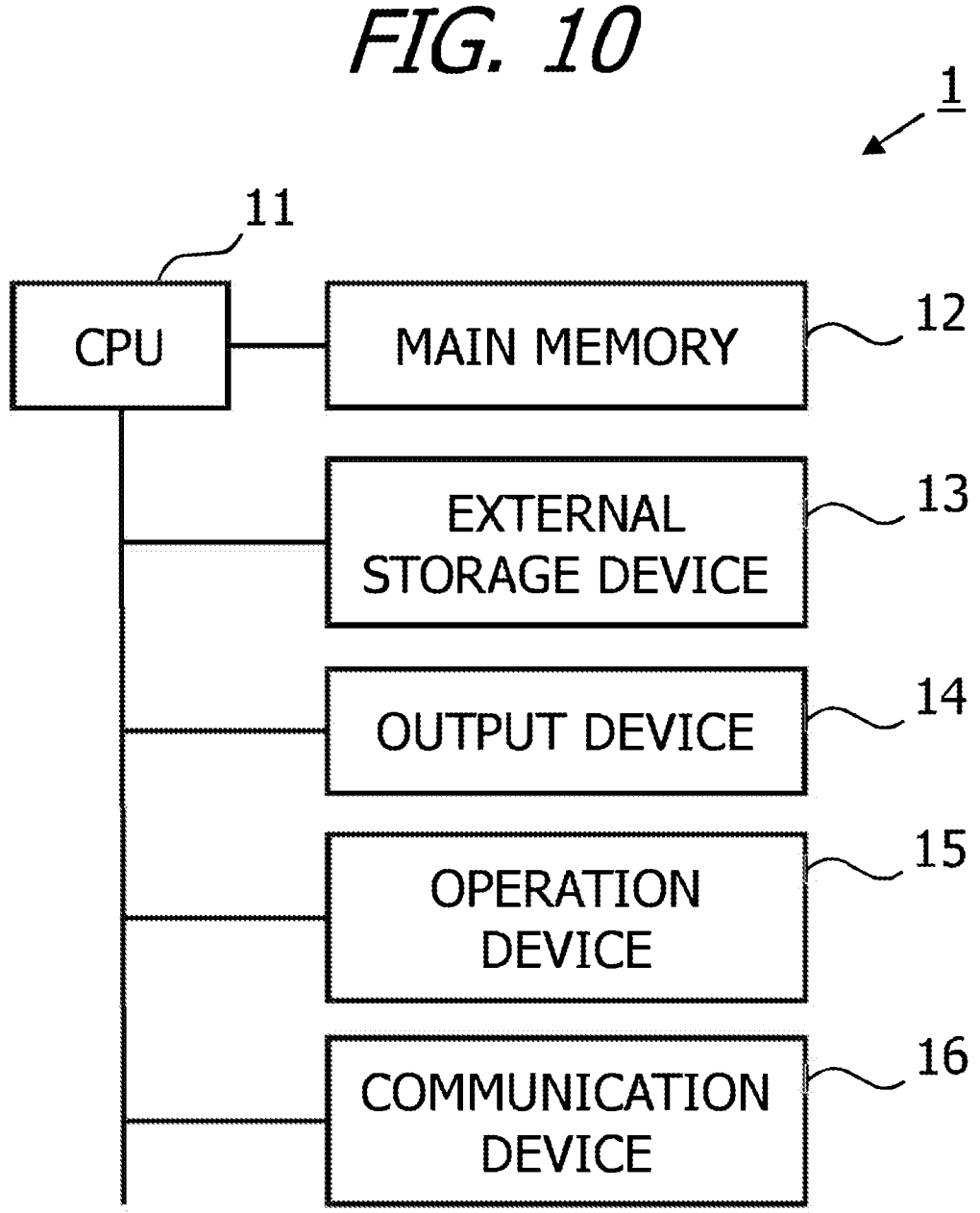
FIG. 10 is a diagram illustrating a hardware configuration of the control apparatus.

FIG. 10 is a diagram illustrating a hardware configuration of the control apparatus 1. The control apparatus 1 includes a CPU 11, a main memory 12 and external equipment and executes communication processing and information processing by a computer program. The CPU 11 is also referred to as a processor. The CPU 11 is not limited to a single processor and may employ a multiprocessor configuration. Further, the CPU 11 may include a graphics processing unit (GPU), a digital signal processor (DSP), and the like. Still further, the CPU 11 may coordinate with a hardware circuit such as a field programmable gate array (FPGA). Examples of the external equipment can include an external storage device 13, an output device 14, an operation device 15 and a communication device 16.

The CPU 11 executes a computer program loaded to the main memory 12 so as to be executable and provides processing of the control apparatus 1. The main memory 12 stores the computer program to be executed by the CPU 11, data to be processed by the CPU 11, and the like. The main memory 12 is a dynamic random access memory (DRAM), a static random access memory (SRAM), a read only memory (ROM), or the like. Further, the external storage device 13 is, for example, used as a memory area that assists the main memory 12 and stores the computer program to be executed by the CPU 11, data to be processed by the CPU 11, and the like. The external storage device 13 is a hard disk drive, a solid state drive (SSD), or the like. Still further, a drive device of a removable storage medium may be connected to the control apparatus 1. The removable storage medium is, for example, a blu-ray disc, a digital versatile disc (DVD), a compact disc (CD), a flash memory card, or the like. The CPU 11 is an example of the "controller" of the "information processing apparatus".

The output device 14 is, for example, a display device such as a liquid crystal display and an electro luminescence panel. However, the output device 14 may include a speaker and other devices that output sound. The operation device 15 is, for example, a touch panel, or the like, in which a touch sensor is superimposed on a display. The communication device 16, for example, performs communication with the base station 2 and an external network such as the Internet via an optical fiber. The communication device 16 is, for example, a gateway that performs communication with a gateway connected to the base station 2 and an external network such as the Internet. The communication device 16 may be one device or may be a combination of a plurality of devices. Note that a hardware configuration of the control apparatus 1 is not limited to the configuration illustrated in FIG. 10.

FIG. 11 is an example of a flowchart of processing of determining the reception antenna and the transmission antenna to be used for non-regenerative relay at the relay station 3, to be performed by the control apparatus 1 according to the second embodiment. The processing indicated in FIG. 11 is started, for example, in a case where a connection request is received from the terminal station 4 and is executed for each radio frame until communication of the terminal station 4 ends. While the CPU 11 of the control apparatus 1 executes the processing indicated in FIG. 11, description will be provided assuming that the control apparatus 1 executes the processing for convenience sake.

In OP401, the control apparatus 1 transmits to the relay station 3 through the control channel, an instruction to measure propagation characteristics with the terminal station 4, propagation characteristics with the base station 2 and propagation characteristics between antennas for all antennas provided at the relay station 3. In OP402, the control apparatus 1 acquires various kinds of propagation characteristics for which measurement is instructed in OP401, from the relay station 3. For example, information such as the number of antennas provided at the relay station 3, a noise power at the relay station 3 and the reduced amount of the self interference power at the relay station 3 is also acquired along with various kinds of propagation characteristics.

In OP403, the control apparatus 1 determines the reception antenna and the transmission antenna to be used for non-regenerative relay at the relay station 3. The processing of the control apparatus 1 in OP403 is similar to the processing from OP301 to OP304 indicated in FIG. 9. In a case of downlink communication, the noise power at the relay station 3 is used as an approximate value of the noise power at the terminal station 4. In a case of uplink communication, for example, a value of the noise power at the base station 2 specified in the 5G standards is used as the noise power at the base station 2.

In OP404, the control apparatus 1 notifies the relay station 3 of the reception antenna and the transmission antenna to be used for non-regenerative relay through the control channel. Then, the processing indicated in FIG. 11 ends. Note that in a case where there are a plurality of relay stations 3, the control apparatus 1 executes the processing in FIG. 11 for each of the relay stations 3.

Figure 12:
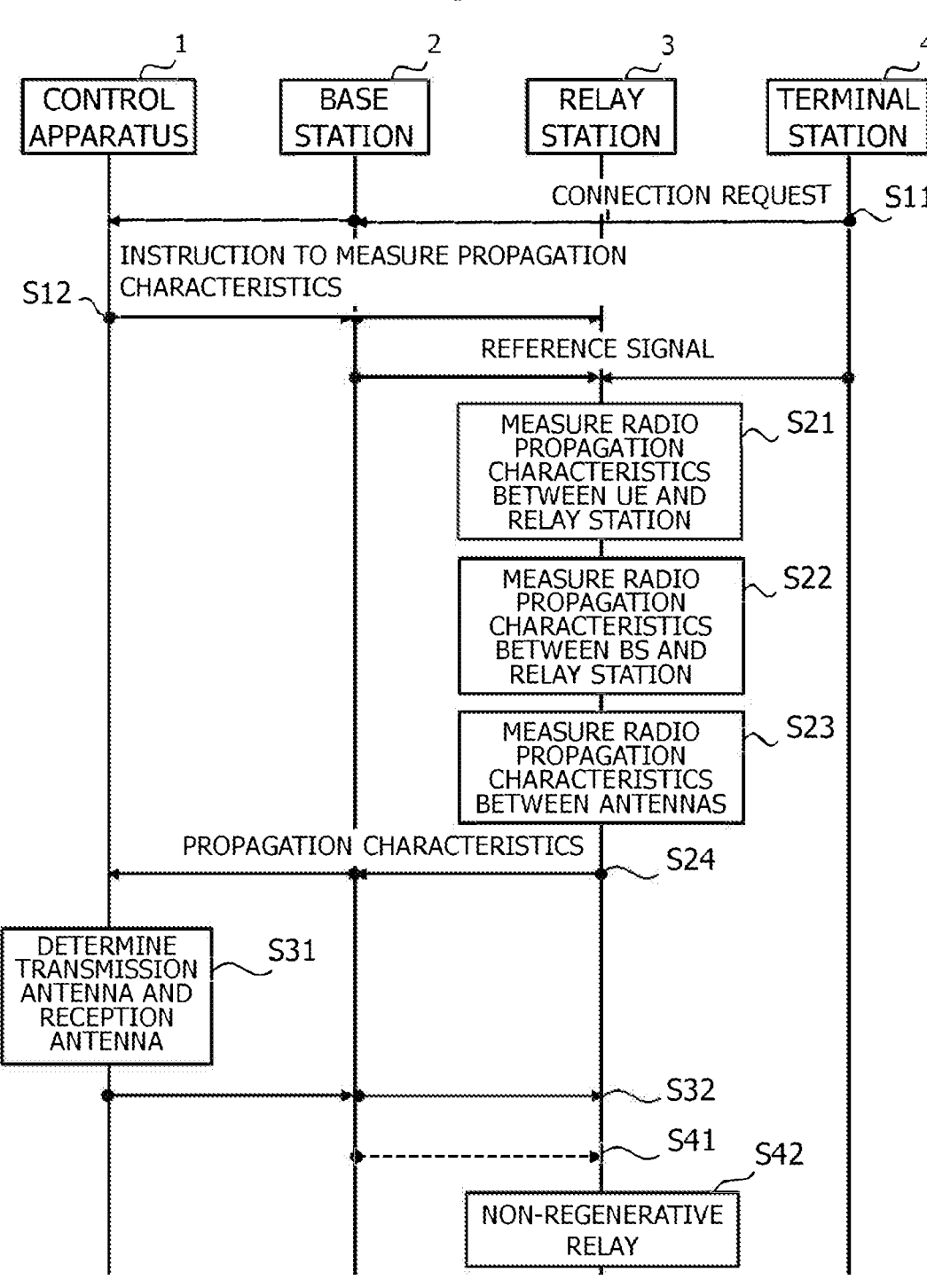
FIG. 12 is a diagram indicating an example of a processing sequence according to the second embodiment.

FIG. 12 is a diagram indicating an example of a processing sequence according to the second embodiment. FIG. 12 is an example assuming the communication system 100A. FIG. 12 includes processing sequences of the control apparatus 1, the base station 2, the relay station 3 and the terminal station 4. Note that in the communication system 100B, the base station 2 is separated into the central base station 2A and one or more distributed base stations 2B. However, the processing of the control circuit 22A of the central base station 2A is similar to that in FIG. 12. FIG. 12 indicates transmission/reception of information through the control channel with a solid line and indicates transmission/reception of information through a data channel with a dashed line.

In S11, a connection request is transmitted from the terminal station 4. The connection request is received by the base station 2 that manages a cell in which the terminal station 4 is located and transferred to the control apparatus 1 from the base station 2. In S12, the control apparatus 1 transmits an instruction to measure various kinds of propagation characteristics to the relay station 3 (FIG. 11, OP401).

The base station 2 and the terminal station 4 transmit a reference signal at predetermined periods. In S21, the relay station 3 receives the reference signal from the terminal station 4 and measures the propagation characteristics between each antenna and the terminal station 4 using the reference signal. In S22, the relay station 3 receives the reference signal from the base station 2 and measures the propagation characteristics between each antenna and the base station 2 using the reference signal. In S23, the relay station 3, for example, executes the processing indicated in FIG. 8 and measures the propagation characteristics between antennas. In S24, the relay station 3 transmits the measured various kinds of propagation characteristics to the control apparatus 1. In this event, the relay station 3 may also notify the control apparatus 1 of, for example, the number of antennas at the relay station 3, the noise power and the reduced amount of the self interference power.

In S31, the control apparatus 1 receives various kinds of propagation characteristics, and the like, from the relay station 3 (FIG. 11, OP402) and determines the reception antenna and the transmission antenna to be used for non-regenerative relay at the relay station 3 (FIG. 11, OP403). In S32, the control apparatus 1 notifies the relay station 3 of the reception antenna and the transmission antenna to be used for non-regenerative relay (FIG. 11, OP404).

In S41, the data signal is transmitted from the base station 2 to the terminal station 4. In S42, the relay station 3 performs non-regenerative relay using the reception antenna and the transmission antenna notified from the control apparatus 1 in S32.

According to the second embodiment, even the control apparatus 1 can estimate the SINR at the terminal station 4 without feedback of the SINR from the terminal station 4 that is the reception station and can efficiently determine the reception antenna and the transmission antenna to be used for non-regenerative relay at the relay station 3.

Note that while in the second embodiment, the relay station 3 creates K combinations for measurement to measure the propagation characteristics between antennas of the relay station 3, the control apparatus 1 may create the K combinations for measurement and notify the relay station 3. In this case, the control apparatus 1, for example, acquires the number of antennas of the relay station 3 through the control channel prior to transmission of an instruction to measure the propagation characteristics.

Further, while in the second embodiment, the control apparatus 1 causes the relay station 3 to measure the propagation characteristics between each antenna and the base station 2 and the propagation characteristics between each antenna and the terminal station 4, the present disclosure is not limited to this. For example, the control apparatus 1 may cause the base station 2 to measure the propagation characteristics between each antenna of the relay station 3 and the base station 2. For example, the control apparatus 1 may cause the terminal station 4 to measure the propagation characteristics between each antenna of the relay station 3 and the terminal station 4.

In the second embodiment, it has been described that the control apparatus 1 determines the reception antenna and the transmission antenna to be used for non-regenerative relay at the relay station 3. The present disclosure is not limited to this, and in place of the control apparatus 1, the base station 2 or the terminal station 4 may determine the reception antenna and the transmission antenna to be used for non-regenerative relay at the relay station 3. By the control circuit 22 of the base station 2 or the control circuit 22A or the control circuit 42 of the terminal station 4 executing the processing indicated in FIG. 11, the base station 2 or the terminal station 4 can determine the reception antenna and the transmission antenna to be used for non-regenerative relay at the relay station 3.

In a case where the base station 2 determines the reception antenna and the transmission antenna to be used for non-regenerative relay at the relay station 3, the base station 2 may, for example, acquire the allowable value of the transmission signal power at the relay station 3, the reduced amount of the self interference power and the noise power from the relay station 3 through the control channel prior to transmission of the data signal or may be notified from the relay station 3 along with various kinds of propagation characteristics or may acquire these kinds of information from the control apparatus 1 in a case where the control apparatus 1 manages these kinds of information. Further, in a case where the base station 2 determines the reception antenna and the transmission antenna to be used for non-regenerative relay at the relay station 3, the base station 2 itself may measure the propagation characteristics between the base station 2 and each antenna of the relay station 3. Still further, the base station 2 may cause the terminal station 4 to measure the propagation characteristics between each antenna of the relay station 3 and the terminal station 4.

In a case where the base station 2 determines the reception antenna and the transmission antenna to be used for non-regenerative relay at the relay station 3 in downlink communication, the base station 2 may directly acquire a noise power at the terminal station 4 as the reception station, for example, from the terminal station 4 through the control channel. Alternatively, the base station 2 may be notified of the noise power at the relay station 3 along with various kinds of propagation characteristics from the relay station 3 and use the noise power at the relay station 3 as an approximate value of the noise power at the terminal station 4. The transmission signal power at the base station 2 is information regarding the base station 2 itself, and thus, the base station 2 uses information held in advance in a memory of the control circuit 22 or the control circuit 22A.

In a case where the base station 2 determines the reception antenna and the transmission antenna to be used for non-regenerative relay at the relay station 3 in uplink communication, the base station 2 may acquire the transmission signal power at the terminal station 4 as the transmission station, for example, from the terminal station 4 through the control channel or may acquire the information from the control apparatus 1 in a case where the control apparatus 1 manages the information. The noise power at the base station 2 as the reception station is information regarding the base station 2 itself, and thus, a specified value held in advance in the control circuit 22 or the control circuit 22A of the base station 2 is used.

In a case where the terminal station 4 determines the reception antenna and the transmission antenna to be used for non-regenerative relay at the relay station 3, the terminal station 4 may, for example, acquire the allowable value of the transmission signal power at the relay station 3, the reduced amount of the self interference power and the noise power from the relay station 3 through the control channel prior to transmission of the data signal or may be notified from the relay station 3 along with various kinds of propagation characteristics or may acquire these kinds of information from the control apparatus 1 in a case where the control apparatus 1 manages these kinds of information. Further, in a case where the terminal station 4 determines the reception antenna and the transmission antenna to be used for non-regenerative relay at the relay station 3, the terminal station 4 itself may measure the propagation characteristics between the terminal station 4 and each antenna of the relay station 3. Further, the terminal station 4 may cause the base station 2 to measure the propagation characteristics between each antenna of the relay station 3 and the base station 2.

In a case where the terminal station 4 determines the reception antenna and the transmission antenna to be used for non-regenerative relay at the relay station 3 in downlink communication, the terminal station 4 may acquire the transmission signal power at the base station 2 as the transmission station, for example, from the base station 2 through the control channel or may acquire the information from the control apparatus 1 through the control channel in a case where the control apparatus 1 manages the information. Further, the noise power at the terminal station 4 as the reception station is information regarding the terminal station 4 itself, and thus, for example, a value held in a memory of the control circuit 42 may be used.

In a case where the terminal station 4 determines the reception antenna and the transmission antenna to be used for non-regenerative relay at the relay station 3 in uplink communication, the terminal station 4 may use, for example, a value held in the memory of the control circuit 42 as the transmission signal power at the terminal station 4 as the transmission station. Further, the terminal station 4 may use, for example, a value specified in the 5G standards as the noise power at the base station 2 as the reception station.

Note that communication between the base station 2 and the relay station 3, communication between the base station 2 and the terminal station 4, and communication between the relay station 3 and the terminal station 4 on the control channel may be directly performed or may be performed by way of the control apparatus 1.

OTHER EMBODIMENTS

The embodiments described above are examples, and the present disclosure may be changed and carried out as appropriate without departing from the gist of the present disclosure.

Description has been provided in the first embodiment and the second embodiment assuming that each of the base station 2 and the terminal station 4 includes one antenna. However, the present disclosure is not limited to this, and each of the base station 2 and the terminal station 4 may include a plurality of antennas, and a plurality of transmission antennas of the transmission station and a plurality of reception antennas of the reception station may be used. In a case where the transmission station includes a plurality of transmission antennas and the reception station includes a plurality of reception antennas, propagation characteristics between the transmission station and the relay station 3 and propagation characteristics between the relay station 3 and the reception station are obtained for between each of the antennas. The propagation characteristics between the transmission station and the relay station 3 and the propagation characteristics between the relay station 3 and the reception station are respectively acquired as channel matrixes. For example, even in a case where the transmission station includes a plurality of transmission antennas and the reception station includes a plurality of reception antennas, the reception antenna and the transmission antenna to be used for non-regenerative relay at the relay station 3 can be determined by replacing the propagation characteristics between the transmission station and the relay station 3 and the propagation characteristics between the relay station 3 and the reception station with the channel matrixes in the expression 2G to the expression 7G.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A relay station comprising:
a plurality of antennas; and
a controller configured to:
when relaying a first signal transmitted from a transmission station to a reception station by amplifying and forwarding, and in a case where one or more first antennas among the plurality of antennas are set as reception antennas for the first signal, and one or more second antennas among the plurality of antennas are set as transmission antennas for the first signal after the relay, estimate a signal to interference and noise power ratio (SINR) of the first signal at the reception station, the first signal being transmitted from the transmission station, received by the one or more first antennas of the relay station, transmitted from the one or more second antennas of the relay station, and received by the reception station, on a basis of a transmit power of the first signal at the transmission station, first propagation characteristics between the one or more first antennas and the transmission station, second propagation characteristics between the one or more second antennas and the reception station, a noise power and an interference power added to the first signal at the relay station, and a noise power at the reception station; and
determine the one or more first antennas and the one or more second antennas in a combination that makes the SINR maximum respectively as the reception antennas and the transmission antennas.

2. The relay station according to claim 1, further comprising a first filter configured to perform filtering to reduce interference between a signal received from the transmission station and the signal to be transmitted to the reception station,
wherein the controller is further configured to:
create a plurality of combinations of the one or more first antennas and the one or more second antennas among the plurality of antennas;
calculate the SINR for each of the plurality of combinations on a basis of the transmit power of the first signal at the transmission station, the first propagation characteristics between the transmission station and the one or more first antennas, the second propagation characteristics between the one or more second antennas and the reception station, a transmit power allowable value of the first signal at the relay station, a reduced amount of interference power by the first filter, third propagation characteristics between the one or more first antennas and the one or more second antennas, the noise power at the relay station, and the noise power at the reception station; and
determine the one or more first antennas and the one or more second antennas in the combination that makes the SINR at the reception station maximum respectively as the reception antennas and the transmission antennas.

3. The relay station according to claim 2, wherein, for each of the plurality of combinations, the controller is further configured to:
calculate an amplification gain at the relay station on a basis of the transmit power of the first signal at the transmission station, the transmit power allowable value of the first signal at the relay station, the reduced amount of interference power by the first filter, the noise power to be applied at the relay station, the first propagation characteristics between the one or more first antennas and the transmission station, and the third propagation characteristics between the one or more first antennas and the one or more second antennas; and
calculate the SINR at the reception station on a basis of (1) a received signal power of the first signal at the reception station after the relay obtained on a basis of the transmit power of the first signal at the transmission station, the first propagation characteristics between the one or more first antennas and the transmission station, the amplification gain and the second propagation characteristics between the one or more second antennas and the reception station, (2) a received signal power of an interference signal to be transmitted from the relay station at the reception station obtained on a basis of the transmit power allowable value of the first signal at the relay station, the third propagation characteristics between the one or more first antennas and the one or more second antennas, the reduced amount of interference power by the first filter, the noise power to be applied at the relay station, the amplification gain, and the second propagation characteristics between the one or more second antennas and the reception station, and (3) the noise power at the reception station.

4. The relay station according to claim 1, wherein, in a case where the transmission station is a base station, and the reception station is a terminal station, the controller is further configured to use a value of the noise power at the relay station as an approximate value of the noise power at the reception station.

5. The relay station according to claim 1, wherein the controller is further configured to:
measure first propagation characteristics between each of the plurality of antennas and the transmission station on a basis of a reference signal from the transmission station;
measure second propagation characteristics between each of the plurality of antennas and the reception station on a basis of a reference signal from the reception station; and transmit a reference signal from at least part of the plurality of antennas and measure third propagation characteristics between each of the plurality of antennas.

6. The relay station according to claim 5, wherein the controller is further configured to:
   create K first combinations, for the plurality of antennas, including one or more transmission antennas that transmit reference signals at the same time and one or more reception antennas that receive the reference signals transmitted at the same time from the one or more transmission antennas; and
   measure the third propagation characteristics for each of the K first combinations between each of the plurality of antennas through transmission and reception of the reference signals, wherein
   the K is an integer obtained by rounding out, to a decimal point, a logarithm to base 2 of a number of the plurality of antennas N as a variable, and
   the K first combinations are created so that a second combination obtained by selecting two antennas of a third antenna and a fourth antenna among the plurality of antennas does not overlap with any of a combination of the third antenna as a transmission antenna for the reference signal and the fourth antenna as a reception antenna for the reference signal and a combination of the fourth antenna as the transmission antenna for the reference signal and the third antenna as the reception antenna for the reference signal among the K first combinations.

7. An information processing apparatus comprising a controller configured to:
   when a relay station including a plurality of antennas relays a first signal transmitted from a transmission station to a reception station by amplifying and forwarding, and in a case where one or more first antennas among the plurality of antennas are set as reception antennas for the first signal, and one or more second antennas among the plurality of antennas are set as transmission antennas for the first signal after the relay, estimate a signal to interference and noise power ratio (SINR) of the first signal at the reception station, the first signal being transmitted from the transmission station, received by the one or more first antennas of the relay station, transmitted from the one or more second antennas of the relay station, and received by the reception station, on a basis of a transmit power of the first signal at the transmission station, first propagation characteristics between the one or more first antennas and the transmission station, second propagation characteristics between the one or more second antennas and the reception station, a noise power and an interference power added to the first signal at the relay station, and a noise power at the reception station; and
   determine the one or more first antennas and the one or more second antennas in a combination that makes the SINR maximum respectively as the reception antennas and the transmission antennas.

8. The information processing apparatus according to claim 7,
   wherein the relay station further comprises a first filter configured to perform filtering to reduce interference between a signal received from the transmission station and the signal to be transmitted to the reception station, and the controller is further configured to:
   create a plurality of combinations of the one or more first antennas and the one or more second antennas among the plurality of antennas;
   calculate the SINR for each of the plurality of combinations on a basis of the transmit power of the first signal at the transmission station, the first propagation characteristics between the transmission station and the one or more first antennas, the second propagation characteristics between the one or more second antennas and the reception station, a transmit power allowable value of the first signal at the relay station, a reduced amount of interference power by the first filter, third propagation characteristics between the one or more first antennas and the one or more second antennas, the noise power at the relay station, and the noise power at the reception station; and
   determine the one or more first antennas and the one or more second antennas in the combination that makes the SINR at the reception station maximum respectively as the reception antennas and the transmission antennas.

9. The information processing apparatus according to claim 8, wherein, for each of the plurality of combinations, the controller is further configured to:
   calculate an amplification gain at the relay station on a basis of the transmit power of the first signal at the transmission station, the transmit power allowable value of the first signal at the relay station, the reduced amount of interference power by the first filter, the noise power to be applied at the relay station, the first propagation characteristics between the one or more first antennas and the transmission station, and the third propagation characteristics between the one or more first antennas and the one or more second antennas; and
   calculate the SINR at the reception station on a basis of (1) a received signal power of the first signal at the reception station after the relay obtained on a basis of the transmit power of the first signal at the transmission station, the first propagation characteristics between the one or more first antennas and the transmission station, the amplification gain and the second propagation characteristics between the one or more second antennas and the reception station, (2) a received signal power of an interference signal to be transmitted from the relay station at the reception station obtained on a basis of the transmit power allowable value of the first signal at the relay station, the third propagation characteristics between the one or more first antennas and the one or more second antennas, the reduced amount of interference power by the first filter, the noise power to be applied at the relay station, the amplification gain, and the second propagation characteristics between the one or more second antennas and the reception station, and (3) the noise power at the reception station.

10. The information processing apparatus according to claim 7, wherein, in a case where the transmission station is a base station, and the reception station is a terminal station, the controller is further configured to use a value of the noise power at the relay station as an approximate value of the noise power at the reception station.

11. The information processing apparatus according to claim 7, wherein the controller is further configured to instruct the relay station to measure first propagation characteristics between each of the plurality of antennas and the transmission station, second propagation characteristics between each of the plurality of antennas and the reception station, and third propagation characteristics between each of the plurality of antennas.

12. The information processing apparatus according to claim 11, wherein the controller is further configured to:

create K first combinations, for the plurality of antennas, including one or more transmission antennas that transmit reference signals at the same time and one or more reception antennas that receive the reference signals transmitted at the same time from the one or more transmission antennas; and instruct the relay station to measure the third propagation characteristics for each of the K first combinations between each of the plurality of antennas through transmission and reception of the reference signals, wherein the K is an integer obtained by rounding out, to a decimal point, a logarithm to base 2 of a number of the plurality of antennas N as a variable, and the K first combinations are created so that a second combination obtained by selecting two antennas of a third antenna and a fourth antenna among the plurality of antennas does not overlap with any of a combination of the third antenna as a transmission antenna for the reference signal and the fourth antenna as a reception antenna for the reference signal and a combination of the fourth antenna as the transmission antenna for the reference signal and the third antenna as the reception antenna for the reference signal among the K first combinations.

13. A method, comprising:

when a relay station including a plurality of antennas relays a first signal transmitted from a transmission station to a reception station by amplifying and forwarding, and in a case where one or more first antennas among the plurality of antennas are set as reception antennas for the first signal, and one or more second antennas among the plurality of antennas are set as transmission antennas for the first signal after the relay, estimating, by a computer, a signal to interference and noise power ratio (SINR) of the first signal at the reception station, the first signal being transmitted from the transmission station, received by the one or more first antennas of the relay station, transmitted from the one or more second antennas of the relay station, and received by the reception station, on a basis of a transmit power of the first signal at the transmission station, first propagation characteristics between the one or more first antennas and the transmission station, second propagation characteristics between the one or more second antennas and the reception station, a noise power and an interference power added to the first signal at the relay station, and a noise power at the reception station; and determining, by the computer, the one or more first antennas and the one or more second antennas in a combination that makes the SINR maximum respectively as the reception antennas and the transmission antennas.

14. The method according to claim 13, wherein the relay station further comprises a first filter configured to perform filtering to reduce interference between a signal received from the transmission station and the signal to be transmitted to the reception station, and the method further comprises:

creating, by the computer, a plurality of combinations of the one or more first antennas and the one or more second antennas among the plurality of antennas, calculating, by the computer, the SINR for each of the plurality of combinations on a basis of the transmit power of the first signal at the transmission station, the first propagation characteristics between the transmission station and the one or more first antennas, the second propagation characteristics between the one or more second antennas and the reception station, a transmit power allowable value of the first signal at the relay station, a reduced amount of interference power by the first filter, third propagation characteristics between the one or more first antennas and the one or more second antennas, the noise power at the relay station, and the noise power at the reception station, and determining, by the computer, the one or more first antennas and the one or more second antennas in the combination that makes the SINR at the reception station maximum respectively as the reception antennas and the transmission antennas.

15. The method according to claim 14, wherein, for each of the plurality of combinations, the method further comprises:

calculating, by the computer, an amplification gain at the relay station on a basis of the transmit power of the first signal at the transmission station, the transmit power allowable value of the first signal at the relay station, the reduced amount of interference power by the first filter, the noise power to be applied at the relay station, the first propagation characteristics between the one or more first antennas and the transmission station, and the third propagation characteristics between the one or more first antennas and the one or more second antennas; and calculating, by the computer, the SINR at the reception station on a basis of (1) a received signal power of the first signal at the reception station after the relay obtained on a basis of the transmit power of the first signal at the transmission station, the first propagation characteristics between the one or more first antennas and the transmission station, the amplification gain and the second propagation characteristics between the one or more second antennas and the reception station, (2) a received signal power of an interference signal to be transmitted from the relay station at the reception station obtained on a basis of the transmit power allowable value of the first signal at the relay station, the third propagation characteristics between the one or more first antennas and the one or more second antennas, the reduced amount of interference power by the first filter, the noise power to be applied at the relay station, the amplification gain, and the second propagation characteristics between the one or more second antennas and the reception station, and (3) the noise power at the reception station.

16. The method according to claim 13, wherein the method further comprises: in a case where the transmission station is a base station, and the reception station is a terminal station, using, by the computer, a value of the noise power at the relay station as an approximate value of the noise power at the reception station.

17. The method according to claim 13, wherein the computer is provided at the relay station, and the method further comprises:

measuring, by the computer, first propagation characteristics between each of the plurality of antennas and the transmission station on a basis of a reference signal from the transmission station;

measuring, by the computer, second propagation characteristics between each of the plurality of antennas and the reception station on a basis of a reference signal from the reception station; and transmitting, by the computer, a reference signal from at least part of the plurality of antennas and measuring, by the computer, third propagation characteristics between each of the plurality of antennas.

18. The method according to claim 17, further comprising:

creating, by the computer, K first combinations, for the plurality of antennas, including one or more transmission antennas that transmit reference signals at the same time and one or more reception antennas that receive the reference signals transmitted at the same time from the one or more transmission antennas; and measuring, by the computer, the third propagation characteristics for each of the K first combinations between each of the plurality of antennas through transmission and reception of the reference signals, wherein the K is an integer obtained by rounding out, to a decimal point, a logarithm to base 2 of a number of the plurality of antennas N as a variable, and the K first combinations are created so that a second combination obtained by selecting two antennas of a third antenna and a fourth antenna among the plurality of antennas does not overlap with any of a combination of the third antenna as a transmission antenna for the reference signal and the fourth antenna as a reception antenna for the reference signal and a combination of the fourth antenna as the transmission antenna for the reference signal and the third antenna as the reception antenna for the reference signal among the K first combinations.

\* \* \* \* \*